United States Patent
Lee et al.

(10) Patent No.: US 10,050,291 B2
(45) Date of Patent: Aug. 14, 2018

(54) METAL AIR BATTERY SYSTEM AND METHOD OF OPERATING THE SAME

(71) Applicant: Samsung Electronics Co., Ltd., Suwon-si, Gyeonggi-do (KR)

(72) Inventors: Heungchan Lee, Seongnam-si (KR); Jeongsik Ko, Seongnam-si (KR); Hyukjae Kwon, Suwon-si (KR); Kihyun Kim, Seoul (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 117 days.

(21) Appl. No.: 15/153,903

(22) Filed: May 13, 2016

(65) Prior Publication Data

US 2017/0104228 A1 Apr. 13, 2017

(30) Foreign Application Priority Data

Oct. 8, 2015 (KR) .................. 10-2015-0141635

(51) Int. Cl.
*H02J 7/00* (2006.01)
*H01M 8/22* (2006.01)
(Continued)

(52) U.S. Cl.
CPC ... *H01M 8/04231* (2013.01); *H01M 8/04119* (2013.01); *H01M 8/04761* (2013.01);
(Continued)

(58) Field of Classification Search
CPC ......... H01M 8/04231; H01M 8/04119; H01M 8/04761
(Continued)

(56) References Cited

U.S. PATENT DOCUMENTS

| | | |
|---|---|---|
| 5,888,664 A | 3/1999 | Sieminski et al. |
| 6,641,947 B1 | 11/2003 | Molloy et al. |

(Continued)

FOREIGN PATENT DOCUMENTS

| | | |
|---|---|---|
| EP | 2775560 A1 | 9/2014 |
| JP | 2006210118 A | 8/2006 |

(Continued)

OTHER PUBLICATIONS

European Search Report for European Patent Application No. 16190325.7 dated Dec. 5, 2016.

(Continued)

*Primary Examiner* — M'Baye Diao
(74) *Attorney, Agent, or Firm* — Cantor Colburn LLP

(57) ABSTRACT

A metal air battery system includes an air intake apparatus configured to draw external air, a metal air battery module configured to receive oxygen from the air intake apparatus to perform a discharging reaction, and comprising at least one inlet through configured for oxygen inflow and at least one outlet configured for oxygen outflow, and a flow path connection unit connecting the air intake apparatus to the metal air battery module. A position of the at least one inlet and a position of the at least one outlet is con figured to alternate between a first opening in the metal air battery module and a second opening in the metal air battery module as the metal air battery module is discharged, and the metal air battery system is configured so that at least a portion of the oxygen in the metal air battery module is removed during a charging reaction.

22 Claims, 25 Drawing Sheets

(51) Int. Cl.
    H01M 8/04223    (2016.01)
    H01M 12/08      (2006.01)
    H01M 8/04119    (2016.01)
    H01M 8/04746    (2016.01)
    H01M 10/44      (2006.01)
    H01M 10/46      (2006.01)

(52) U.S. Cl.
    CPC .......... H01M 10/44 (2013.01); H01M 10/46 (2013.01); H01M 12/08 (2013.01); H02J 7/0042 (2013.01)

(58) Field of Classification Search
    USPC .................................. 320/107; 429/406, 403
    See application file for complete search history.

(56) References Cited

U.S. PATENT DOCUMENTS

| | | | |
|---|---|---|---|
| 6,759,159 | B1 | 7/2004 | Gray et al. |
| 7,771,676 | B2* | 8/2010 | Son .......................... B01J 8/025 |
| | | | 422/114 |
| 8,530,566 | B2 | 9/2013 | Lin et al. |
| 8,557,414 | B2* | 10/2013 | Hermann .......... H01M 8/04089 |
| | | | 180/54.1 |
| 8,871,395 | B2* | 10/2014 | Nakanishi ............... H01M 6/14 |
| | | | 429/408 |
| 9,234,085 | B2 | 1/2016 | Sun et al. |
| 9,680,193 | B2* | 6/2017 | Amendola ............ H01M 12/08 |
| 2003/0017376 | A1 | 1/2003 | Tsai et al. |
| 2003/0138684 | A1* | 7/2003 | Tinker .................... H01M 2/10 |
| | | | 429/403 |
| 2004/0023103 | A1* | 2/2004 | Molloy ................. H01M 12/06 |
| | | | 429/403 |
| 2004/0241537 | A1* | 12/2004 | Okuyama ........... H01M 2/0275 |
| | | | 429/86 |
| 2005/0074662 | A1 | 4/2005 | Cho et al. |
| 2013/0309584 | A1* | 11/2013 | Ryou ...................... H01M 2/12 |
| | | | 429/406 |
| 2014/0338192 | A1 | 11/2014 | Chung et al. |
| 2015/0010833 | A1* | 1/2015 | Amendola .......... H01M 4/8647 |
| | | | 429/406 |
| 2016/0149278 | A1 | 5/2016 | Woehrle et al. |

FOREIGN PATENT DOCUMENTS

| | | |
|---|---|---|
| JP | 2010176993 A | 8/2010 |
| JP | 2010277857 A | 12/2010 |
| JP | 2011171260 A | 9/2011 |
| JP | 2012188645 A | 10/2012 |
| JP | 2014133783 A | 7/2014 |
| JP | 2014141627 A | 8/2014 |
| KR | 100519970 B1 | 9/2005 |
| KR | 1020140082599 A | 7/2014 |

OTHER PUBLICATIONS

Harding et al., "Instability of Poly (ethylene oxide) upon Oxidation in Lithium-Air Batteries", The Journal of Physical Chemistry C., 119, 2015, pp. 6947-6955.

Zhang et al, "Ambient operation of Li/Air Batteries", Journal of Power Sources, 195, 2010, pp. 4332-4337.

* cited by examiner

METAL AIR BATTERY SYSTEM AND METHOD OF OPERATING THE SAME

CROSS-REFERENCE TO RELATED APPLICATION

This application claims priority to and the benefit of Korean Patent Application No. 10-2015-0141635, filed on Oct. 8, 2015, in the Korean Intellectual Property Office, and all the benefits accruing therefrom under 35 U.S.C. § 119, the content of which is incorporated herein its entirety by reference.

BACKGROUND

1. Field

The present disclosure relates to a metal air battery system and a method of operating the metal air battery system.

2. Description of the Related Art

A metal air battery includes an anode capable of adsorbing and desorbing ions and a cathode capable of using oxygen present in ambient air as an active material. Reduction and oxidation reactions of the oxygen occur at the cathode, whereas oxidation and reduction reactions of a metal occur at the anode. Chemical energy generated during these reactions is converted to and extracted as electrical energy. For example, a metal air battery adsorbs oxygen during discharging and desorbs oxygen during charging. As such, since the metal air battery uses oxygen in the air, an energy density of the metal air battery may be rapidly improved. However, in the metal air battery, a small amount of impurities such as moisture or carbon dioxide or discharge by-products generated during discharging may deteriorate the battery.

SUMMARY

Provided are a metal air battery system and a method of operating the metal air battery system.

According to an aspect of an exemplary embodiment, a metal air battery system includes: an air intake apparatus configured to draw external air; a metal air battery module configured to receive oxygen from the air intake apparatus to perform a discharge reaction, and including at least one inlet configured for oxygen inflow and at least one outlet configured for oxygen outflow; and a flow path connection unit connecting the air intake apparatus to the metal air battery module, wherein a position of the at least one inlet and a position of the at least one outlet is configured to alternate between a first opening in the metal air battery module and a second opening in the metal air battery module as the metal air battery module is discharged, and wherein the metal air battery system is configured so that at least a portion of the oxygen in the metal air battery module is removed during a charging reaction of the metal air battery module.

The air intake apparatus may include a purifier configured to purify external air and remove moisture from the air, and a separator configured to separate the air purified by the purifier into oxygen and nitrogen.

The position of the inlet and the position of the outlet may be alternately reversed by the flow path connection unit.

In the metal air battery system, the air intake apparatus may be configured to remove the portion of the oxygen from the metal air battery module and exhaust the oxygen to an outside of the metal air battery system.

The at least part of the oxygen in the metal air battery module may be removed by supplying nitrogen to the metal air battery module.

The air intake apparatus may be configured to supply nitrogen to the metal air battery module via the flow path connection unit.

The metal air battery system may further include a vacuum pump configured to remove the portion of the oxygen in the metal air battery module to an outside of the metal air battery system during the charging reaction of the metal air battery module.

The vacuum pump may be connected to the flow path connection unit.

The metal air battery system may further include an inert gas supply unit configured to supply gas to the metal air battery module.

The inert gas may be argon, helium, or nitrogen.

The inert gas supply unit may be connected to the flow path connection unit.

The metal air battery module may include at least one cell and the at least one cell includes a cathode, an anode, and an electrolyte.

The metal air battery module may include a plurality of cells connected in series, in parallel, or a combination of series and parallel.

According to an aspect of another exemplary embodiment, in a method of operating a metal air battery system, the method includes: providing a metal air battery system including a metal air battery module, the metal air battery module including at least one inlet through which oxygen flows into the metal air battery module from an air intake apparatus, and at least one outlet through which the oxygen flows out of the metal air battery module, discharging the metal air battery module; alternately reversing a position of the at least one inlet and a position of the at least one outlet between a first opening in the metal air battery module and a second opening in the metal air battery module during the discharging, charging the metal air battery module after the discharging of the metal air battery module; and removing at least a portion of the oxygen in the metal air battery module during the charging of the metal air battery module to operate the metal air battery system.

The position of the inlet and the position of the outlet may be alternately reversed by a flow path connection unit which connects the air intake apparatus to the metal air battery module.

During the charging of the metal air battery module, the portion of the oxygen in the metal air battery module may be exhausted to the outside by reverse operation of the air intake apparatus.

During the charging of the metal air battery module, a portion of the oxygen in the metal air battery module may be removed by supplying nitrogen to the metal air battery module.

The air intake apparatus may supply the nitrogen to the metal air battery module.

During the charging of the metal air battery module, a portion of the oxygen in the metal air battery module may be exhausted to an outside of the metal air battery system by a vacuum.

During the charging of the metal air battery module, a portion of the oxygen in the metal air battery module may be removed by supplying an inert gas to the metal air battery module.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
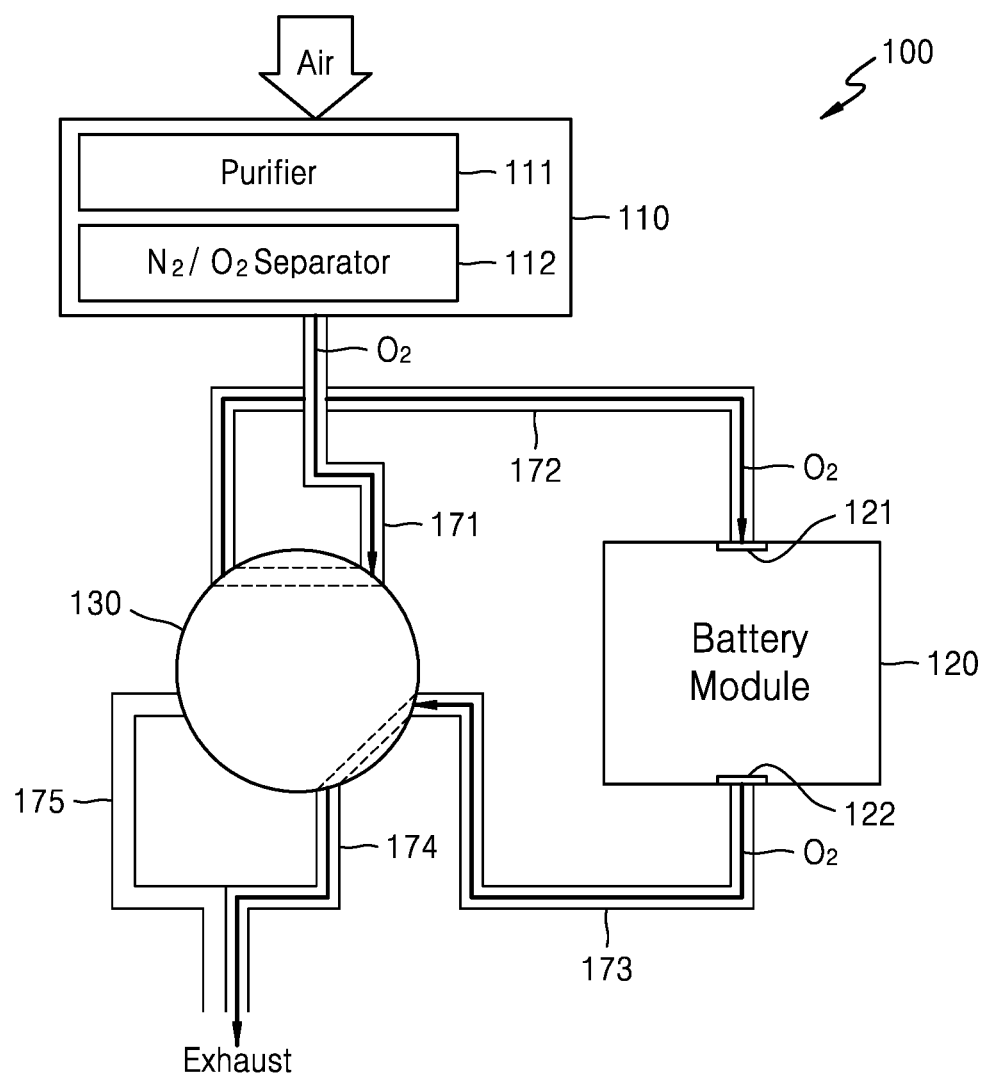
FIGS. 1A to 1E illustrate a metal air battery system and a method of operating the metal air battery system, according to an exemplary embodiment.

Reference will now be made in detail to exemplary embodiments, examples of which are illustrated in the accompanying drawings, wherein like reference numerals refer to like elements throughout. The size of each layer illustrated in the drawings may be exaggerated for convenience of explanation and clarity. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "above" or "on" another element, it can be directly above or on the other element, or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A lithium air battery is a type of metal air battery that uses lithium as an anode and oxygen present in ambient air as an active material for a cathode. An electrolyte is disposed between the cathode and the anode. In the lithium air battery, the following reaction occurs during discharge of the battery cell as follows.

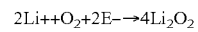

$$2Li^+ + O_2 + 2E^- \rightarrow 4Li_2O_2 \quad (1)$$

In the lithium air battery, during a discharging reaction, lithium ions and electrons are generated by an oxidation reaction of lithium metal. The lithium ions move through the electrolyte and the electrons move to the cathode along an external wire. Then, oxygen included in the air is drawn toward the cathode and reduced by the electrons moving along the wire, thereby generating $Li_2O_2$ as a discharge by-product. A charging reaction is performed in a direction opposite to the discharging reaction.

When the lithium air battery is operated, the air containing oxygen is injected into the battery. In this state, the presence of a small amount of impurities in the air, such as moisture or carbon dioxide, causes side reactions to occur within the battery, thereby shortening the lifespan of the battery. Examples of potential side reactions which may occur are shown below:

$$2Li_2O_2 + 2H_2O \rightarrow 4LiOH + O_2 \quad (2)$$

$$2LiOH + CO_2 \rightarrow Li_2CO_3 + H_2O \quad (3)$$

$$2Li^+ + \tfrac{1}{2}O_2 + CO_2 + 2e^- \rightarrow Li_2CO_3 \quad (4)$$

In a lithium air battery, an air inlet and an air outlet of a battery module are fixed. Accordingly, when air having a relatively high impurity content is continuously supplied to the battery module through the air inlet of the battery module, the air inlet and battery components within the immediate vicinity of the air inlet may deteriorate faster than components within the immediate vicinity of the air outlet. Accordingly, since a deterioration speed may vary according to the position of battery cells in the battery module, the lifespan of a lithium air battery may be shortened. Also, during the charging of a lithium air battery, oxygen remaining in the battery cell accelerates dissolution of an electrolyte, and as a result, the lifespan of the lithium air battery may be shortened.

FIGS. 1A to 1E illustrate a metal air battery system 100 and a method of operating the same, according to an exemplary embodiment.

Referring to FIGS. 1A to 1E, the metal air battery system 100 may include an air intake apparatus 110, a metal air battery module 120, and a flow path connection unit 130. The air intake apparatus 110 draws in external air (e.g., intake of air from outside of the metal air battery system 100) during a discharging reaction. The air intake apparatus 110 may include a purifier 111 and a separator 112. The purifier 111 may purify the drawn air and remove moisture from the air. The separator 112 may separate the purified air into oxygen and nitrogen. As such, oxygen purified by the purifier 111 and separated by the separator 112 of the air intake apparatus 110 is supplied to the metal air battery module 120 and the discharging reaction may be performed.

The metal air battery module 120 may perform a discharging reaction by receiving a supply of oxygen from the air intake apparatus 110. First and second openings 121 and 122, through which oxygen flows in or flows out, are formed in the metal air battery module 120. The first and second openings 121 and 122 may be, respectively, an oxygen inlet and an oxygen outlet, or an oxygen outlet and an oxygen inlet, as the discharging reactions are carried out.

The metal air battery module 120 may include a plurality of cells (not shown). For example, the battery module may include 1 to 1000 cells. The cells may be connected in series, in parallel, or in a combination of series and parallel. Each of the cells performs a discharging reaction using the oxygen supplied from the air intake apparatus 110. Each of the cells may include a cathode, an anode, and an electrolyte. An oxidation-reduction reaction is generated at the cathode using oxygen as an active material, whereas an oxidation-reduction reaction of metal is generated at the anode. The electrolyte enables the conduction of metal ions between the cathode and the anode.

The cathode may include a porous conductive material. The porous conductive material may include a porous carbon-based material such as carbon black, graphite, graphene, activated carbon, carbon nanotube, carbon fiber, or a combination thereof. The cathode may also include, for example, a metal conductive material such as a metal fiber or a metal mesh, or a metal powder such as copper, silver, nickel, aluminum, or a combination thereof. However, the present disclosure is not limited thereto and the cathode may include other types of conductive materials. The conductive materials may be used alone or in combination with other materials. Also, the cathode may further include a binder, an aqueous electrolyte, a non-aqueous electrolyte, a catalyst for the oxidation-reduction reactions, or a combination thereof.

The anode may include a material capable of adsorbing and desorbing metal ions. The material capable of adsorbing and desorbing metal ions may include, for example, lithium (Li), sodium (Na), zinc (Zn), potassium (K), calcium (Ca), magnesium (Mg), iron (Fe), aluminum (Al), a combination thereof, or an alloy thereof. The electrolyte may be a material capable of making metal ions conductive, such as, at least one of a non-aqueous electrolyte, an aqueous electrolyte, a solid electrolyte, or a combination thereof.

The flow path connection unit 130 connects the air intake apparatus 110 and the metal air battery module 120. To this end, the air intake apparatus 110 and the flow path connection unit 130 are fluidly connected to each other by a first flow path 171. The flow path connection unit 130 and the metal air battery module 120 are fluidly connected to each other by a second flow path 172, and the second flow path 172 is fluidly connected to the first opening 121 of the metal air battery module 120. The second opening 122 of the metal air battery module 120 is fluidly connected to the flow path connection unit 130 by a third flow path 173. Fourth and fifth flow paths 174 and 175 fluidly connect the flow path connection unit 130 to the outside of the metal air battery system 100. The flow path connection unit 130 may be configured to selectively connect two or more of the first, second, third, fourth, and fifth flow paths 171, 172, 173, 174, and 175, respectively, as desired. For example, a multi-way valve may be used to connect two or more of the flow paths of the flow path connection unit 130. However, the present disclosure is not limited thereto and other types of valve systems may also be used.

In the metal air battery system 100, the metal air battery module 120 performs a discharging reaction. As the discharging reaction is performed, a position of the oxygen inlet and a position of the oxygen outlet in the metal air battery module 120 may be reversed by the flow path connection unit 130. For example, the position of the inlet and the position of the outlet may be alternated between the first opening 171 in the metal air battery module and the second opening 172 in the metal air battery module. Also, in the metal air battery system 100, the metal air battery module 120 performs a charging reaction after a discharging reaction, e.g., between discharging reactions. In the charging reaction, at least a portion of the oxygen remaining in the metal air battery module 120 may be removed by being exhausted to the outside of the metal air battery module by reversing the operation of the air intake apparatus 110. In this state, the drawing in (i.e. intake) of the external air may be prevented by using the flow path connection unit 130 to close the oxygen outlet.

Figure 1B:
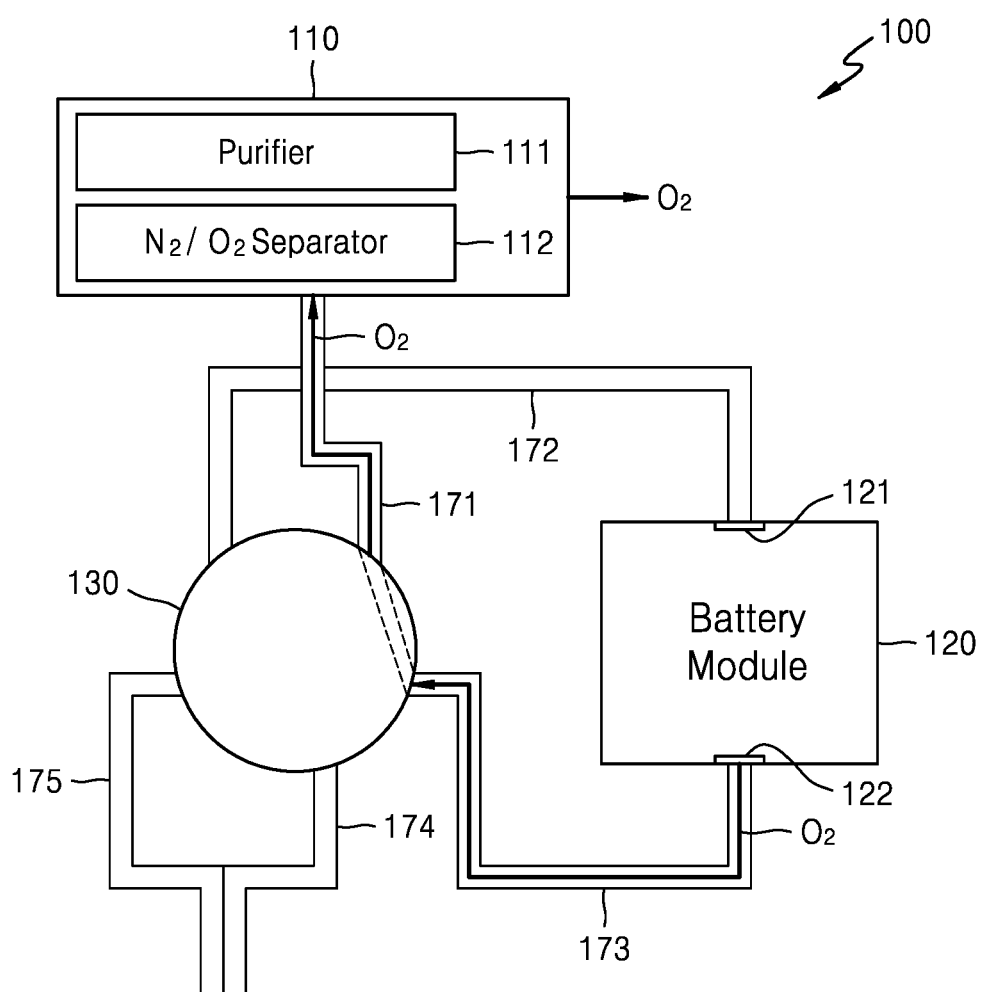
Figure 1C:
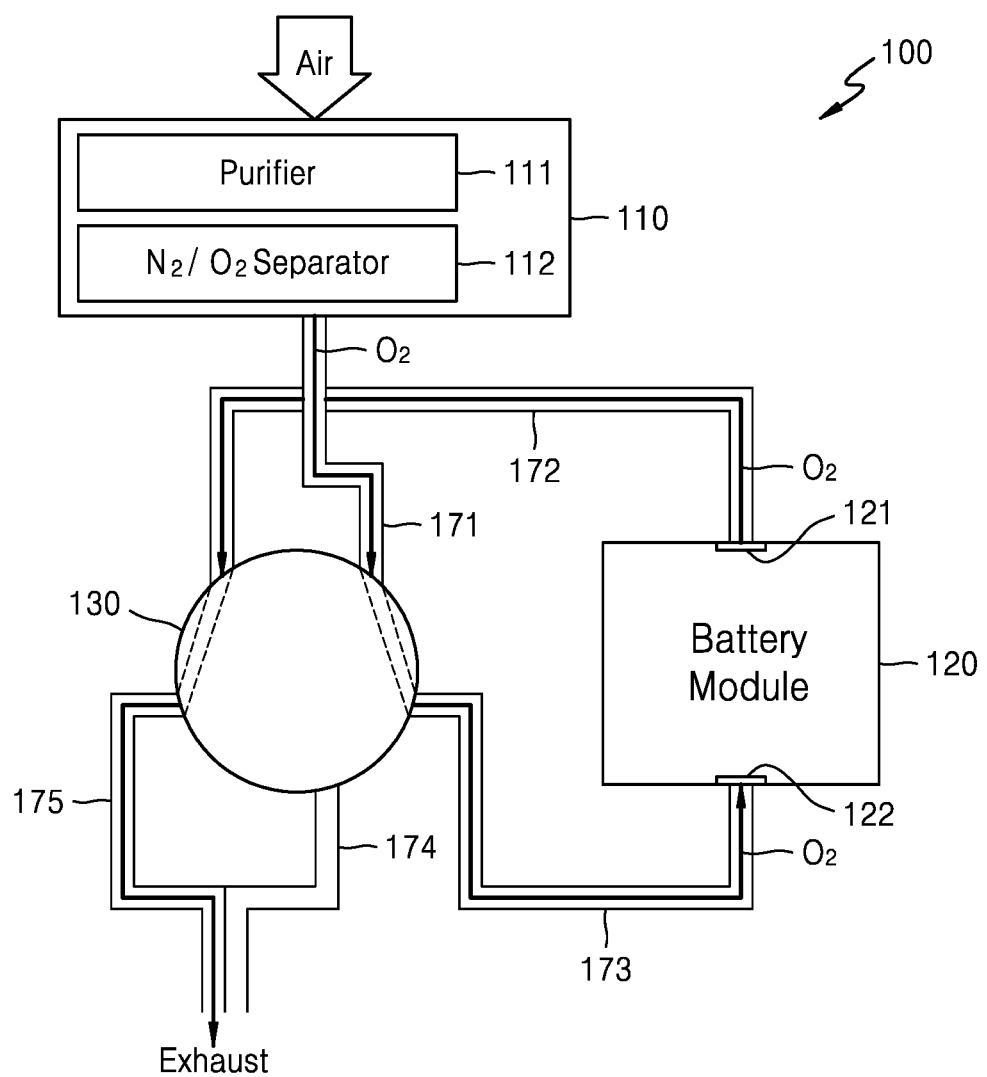
Figure 1D:
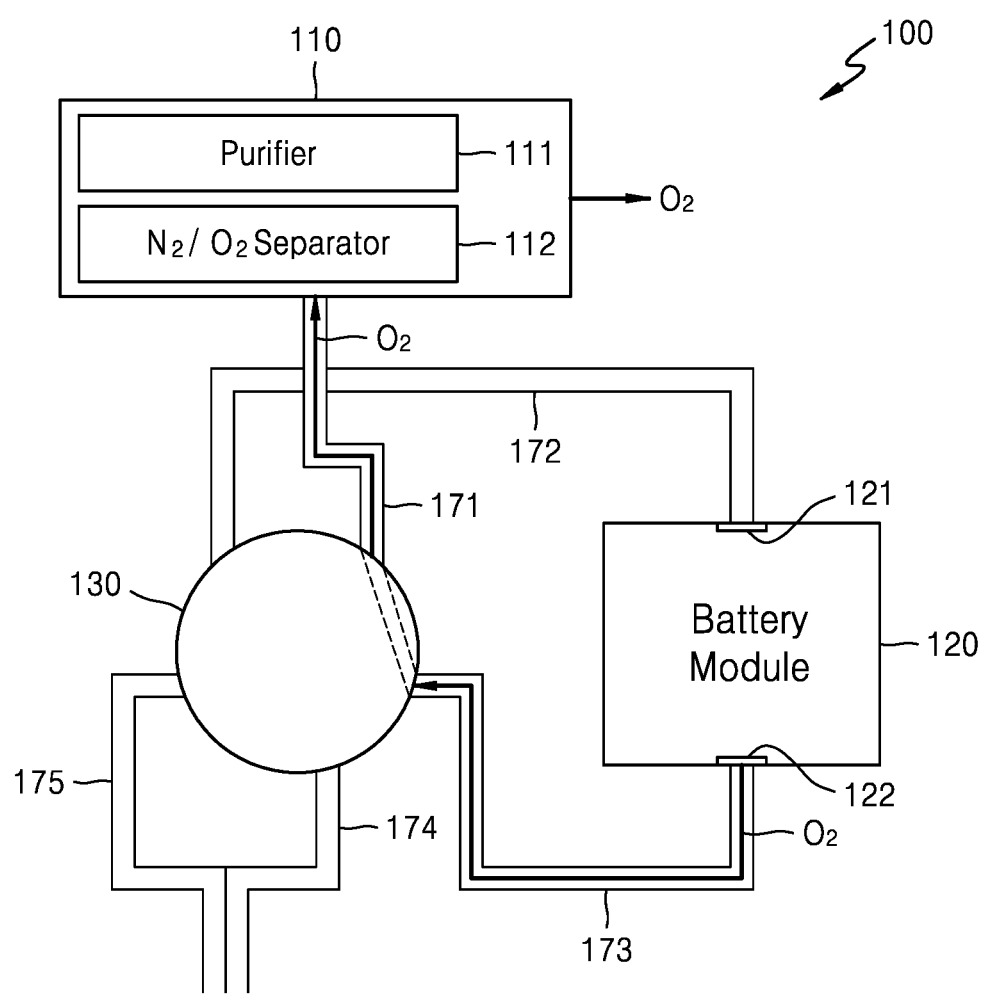
Figure 1E:
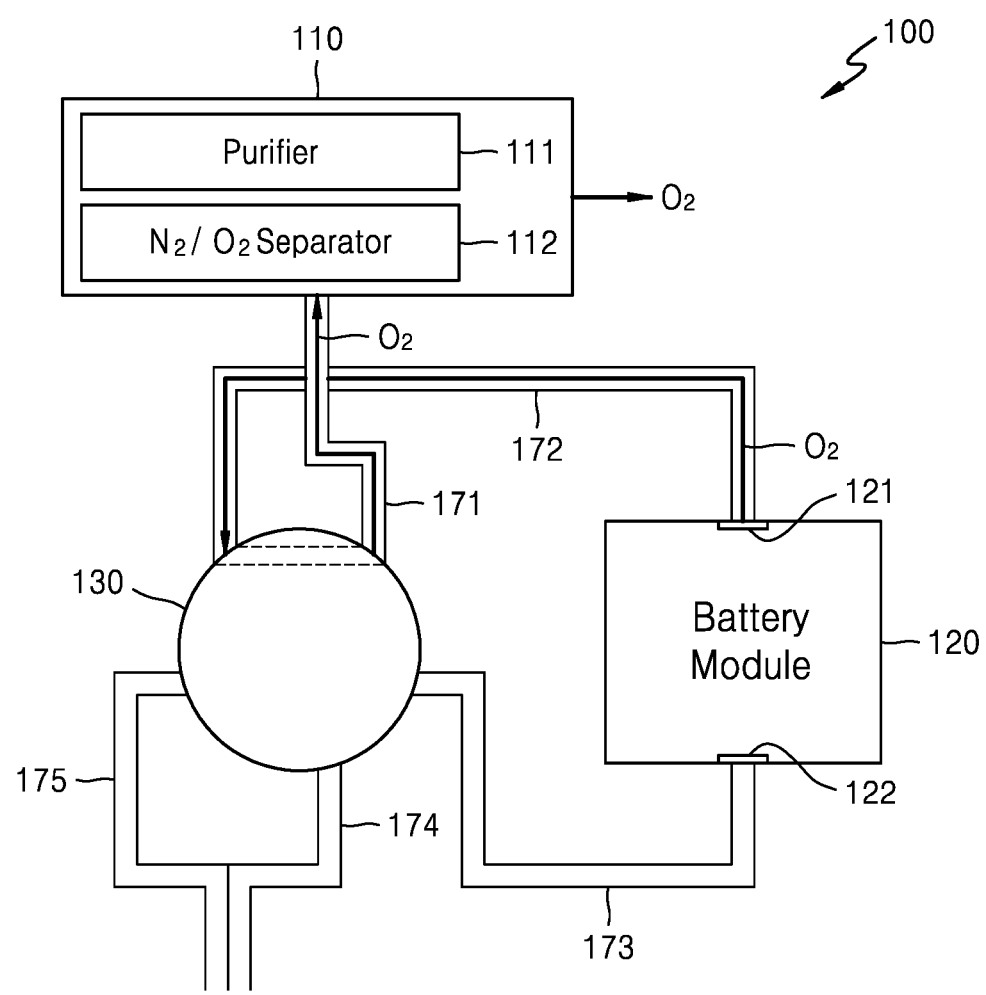

In the following description, the metal air battery system 100 and a method of operating the same are described with reference to FIGS. 1A to 1E. In further detail, FIGS. 1A and 1C illustrate the flow of oxygen ($O_2$) through the metal air battery system 100 while the metal air battery module 120 performs a first discharging reaction and a second discharging reaction, respectively. FIGS. 1B and 1D illustrate flow of oxygen through the metal air battery system 100 while the metal air battery module 120 performs a first charging reaction and a second charging reaction, respectively. FIG. 1E illustrates a modified example of the second charging reaction of FIG. 1D.

FIG. 1A illustrates the flow of oxygen through the metal air battery system 100 while the metal air battery module 120 performs a first discharging reaction. In this state, the flow path connection unit 130 connects the first flow path 171 and the second flow path 172, and connects the third flow path 173 and the fourth flow path 174.

Referring to FIG. 1A, as the air intake apparatus 110 is operated, external air (e.g., air from outside of the metal air battery system) is drawn into the air intake apparatus 110. The purifier 111 purifies the air drawn into the air intake apparatus 110 and removes moisture from the purified air, and the separator 112 separates the air into oxygen and nitrogen. Next, the separated oxygen is drawn into the flow path connection unit 130 via the first flow path 171. Since the flow path connection unit 130 connects the first flow path 171 and the second flow path 172, the oxygen drawn into the flow path connection unit 130 via the first flow path 171 is supplied to the inside of the metal air battery module 120 via the second flow path 172. In this state, the oxygen may be drawn in through the first opening 121 of the metal air battery module 120. In other words, the first opening 121 may function as an oxygen inlet.

The metal air battery module 120 receiving a supply of oxygen through the first opening 121 performs a first discharging reaction. Also, any unused oxygen remaining in the metal air battery module 120 following the discharging reaction is removed from the metal air battery module 120 through the second opening 122. In other words, the second opening 122 may function as an oxygen outlet. The oxygen removed through the second opening 122 is directed into the flow path connection unit 130 through the third flow path 173. Since the flow path connection unit 130 connects the third flow path 173 and the fourth flow path 174, the oxygen directed into the flow path connection unit 130 via the third flow path 173 may be exhausted to the outside via the fourth flow path 174.

As such, in a first discharging reaction process, the air intake apparatus 110 supplies oxygen to the metal air battery module 120 through the first opening 121, and the unused oxygen remaining in the metal air battery module 120 after the discharging reaction is exhausted to the outside through the second opening 122. Accordingly, in the first discharging reaction process, the first and second openings 121 and 122 may function as an oxygen inlet and an oxygen outlet, respectively.

FIG. 1B illustrates that, after the first discharging reaction, the metal air battery module 120 performs a first charging reaction in the metal air battery system 100. In this state, the flow path connection unit 130 connects the first flow path 171 and the third flow path 173.

Referring to FIG. 1B, after the first discharging reaction process is performed, the metal air battery module 120 may perform a first charging reaction using an external electric power source. In the first charging reaction, at least a portion of the oxygen remaining in the metal air battery module 120 may be exhausted to the outside by reversing the operating direction of the air intake apparatus 110. In further detail, when the first flow path 171 and the third flow path 173 are connected to each other by the flow path connection unit 130, and when the air intake apparatus 110 is operated in a reverse direction, at least a portion of the oxygen remaining in the metal air battery module 120 is removed through the second opening 122. The oxygen removed through the second opening 122 is drawn into the flow path connection unit 130 via the third flow path 173 and then into the air intake apparatus 110 via the first flow path 171. The oxygen drawn into the air intake apparatus 110 via the first flow path 171 is then exhausted to the outside of the metal air battery system 100.

FIG. 1C illustrates flow of oxygen in the metal air battery system 100 while the metal air battery module 120 performs a second discharging reaction in the metal air battery system 100. In this state, the flow path connection unit 130 connects the first flow path 171 and the third flow path 173, and fluidly connects the second flow path 172 and the fifth flow path 175.

Referring to FIG. 1C, as the air intake apparatus 110 is operated, the external air is drawn into the air intake apparatus 110. The purifier 111 purifies the air drawn into the air intake apparatus 110 and removes moisture from the purified air, and then the separator 112 separates the air into oxygen and nitrogen. Next, the separated oxygen is drawn into the flow path connection unit 130 via the first flow path 171. Since the flow path connection unit 130 connects the first flow path 171 and the third flow path 173, the oxygen drawn into the flow path connection unit 130 via the first flow path 171 is supplied to the inside of the metal air battery module 120 via the third flow path 173. In this state, the oxygen may be drawn into the metal air battery module 120 through the second opening 122 of the metal air battery module 120. In other words, the second opening 122 may function as an oxygen inlet.

The metal air battery module 120 performs a second discharging reaction by receiving a supply of oxygen through the second opening 122. The unused oxygen remaining in the metal air battery module 120 following the second discharging reaction is removed through the first opening 121. In other words, the first opening 121 may function as an oxygen outlet. The oxygen removed through the first opening 121 is drawn into the flow path connection unit 130 via the second flow path 172. Since the flow path connection unit 130 connects the second flow path 172 and the fifth flow path 175, the oxygen drawn into the flow path connection unit 130 via the second flow path 172 may be exhausted to the outside of the metal air battery system 100 via the fifth flow path 175.

As such, in a second discharging reaction process, the air intake apparatus 110 supplies oxygen to the metal air battery module 120 through the second opening 122, and the unused oxygen remaining in the metal air battery module 120 following the second discharging reaction is exhausted to the outside through the first opening 121. Accordingly, in the second discharging reaction process, the first and second openings 121 and 122 may function as an oxygen outlet and an oxygen inlet, respectively. This is opposite to the first discharging reaction process in which the first and second openings 121 and 122 function as an oxygen inlet and an oxygen outlet, respectively.

Referring to FIG. 1D, after the second discharging reaction process, the metal air battery module 120 performs a second charging reaction in the metal air battery system 100. In this state, the flow path connection unit 130 connects the first flow path 171 and the third flow path 173.

The second charging reaction process of the metal air battery module 120 in FIG. 1D is the same as described for the first charging reaction process of the metal air battery module 120 in FIG. 1B. Accordingly, in the second charging reaction, at least a portion of the oxygen remaining in the metal air battery module 120 may be exhausted to the outside through the second opening 122 of the metal air battery module 120 by reversing the direction of operation of the air intake apparatus 110.

FIG. 1E illustrates a modified example of the second charging reaction of FIG. 1D. In this state, the flow path connection unit 130 connects the first flow path 171 and the second flow path 172. Referring to FIG. 1E, during the second charging reaction, the unused oxygen remaining in the metal air battery module 120 may be exhausted to the outside by the reverse operation of the air intake apparatus 110. In further detail, in a state in which the first flow path 171 and the second flow path 172 are fluidly connected to each other by the flow path connection unit 130, when the direction of operation of the air intake apparatus 110 is reversed, the oxygen remaining in the metal air battery module 120 is removed through the first opening 121. The oxygen removed through the first opening 121 is drawn into the flow path connection unit 130 via the second flow path 172, and then into the air intake apparatus 110 via the first flow path 171. The oxygen drawn into the air intake apparatus 110 via the first flow path 171 is then exhausted to the outside. As such, in the second charging reaction illustrated in FIG. 1E, at least a portion of the oxygen remaining in the metal air battery module 120 may be exhausted to the outside through the first opening 121 of the metal air battery module 120 by the reverse operation of the air intake apparatus 110.

In the above description, an embodiment is described in which the position of the oxygen inlet and the position of the oxygen outlet are reversed (i.e. alternated) as the process is shifted from the first discharging reaction process to the second discharging reaction process. However, the present disclosure is not limited thereto and, during the first discharging process or the second discharging process, the position of the oxygen inlet and the position of the oxygen outlet may be reversed to be the opposite of what was previously described. In other words, as the discharging processes are performed, the position of the oxygen inlet and the position of the oxygen outlet may be reversed with respect to each other in various ways.

According to an exemplary embodiment, the metal air battery system 100 may alternately and repeatedly perform the discharging reactions and the charging reactions. In this state, as the metal air battery module 120 performs the discharging reactions, the position of the oxygen inlet and the position of the oxygen outlet are alternately reversed in the metal air battery module 120 and thus the lifespan of the metal air battery module 120 may be increased. Oxygen having a higher impurity content at an oxygen inlet side than at an oxygen outlet side is supplied to the metal air battery module 120. Accordingly, in a situation in which the position of the oxygen inlet and the position of the oxygen outlet are fixed in the metal air battery module 120, as the discharging reactions are performed, the cells arranged at the oxygen inlet side deteriorate faster than cells at the oxygen outlet side in the metal air battery module 120, resulting in uneven deterioration of the cells so that the lifespan of the metal air battery module 120 may be shortened. According to an exemplary embodiment, in the metal air battery system 100, when the discharging reactions are performed by alternately reversing the position of the oxygen inlet and the position of the oxygen outlet in the metal air battery module 120, the speed of deterioration of the cells in the metal air battery module 120 may be more uniform. Accordingly, the lifespan of the metal air battery module 120 may be increased.

Also, according to an exemplary embodiment, in the metal air battery system 100, the charging reactions are performed between the discharging reactions and, in the charging reaction process, at least a portion of the oxygen remaining in the metal air battery module 120 may be exhausted to the outside by the reverse operation of the air intake apparatus 110. Accordingly, deterioration of the cells due to the oxygen remaining in the metal air battery module 120 is prevented, and the lifespan of the metal air battery module 120 may be further increased.

FIGS. 2A to 2E illustrate a metal air battery system 200 and a method of operating the same, according to another exemplary embodiment.

Referring to FIGS. 2A to 2E, the metal air battery system 200 may include the air intake apparatus 110, the metal air battery module 120, and the flow path connection unit 130. The air intake apparatus 110 draws in external air during a discharging reaction. The air intake apparatus 110 may include the purifier 111 for purifying the drawn air and removing moisture from the air and the separator 112 for separating the purified air into oxygen and nitrogen.

The metal air battery module 120 may perform a discharging reaction by receiving a supply of oxygen from the air intake apparatus 110. The first and second openings 121 and 122, respectively, through which oxygen flows in or flows out, are disposed in the metal air battery module 120. The metal air battery module 120 may include a plurality of cells (not shown) connected in series, in parallel, or in a combination of series and parallel. Each of the cells performs a discharging reaction using the oxygen supplied from the air intake apparatus 110. Each of the cells may include a cathode, an anode, and an electrolyte. An oxidation-reduction reaction of oxygen occurs at the cathode using oxygen as an active material, while an oxidation-reduction reaction of metal occurs at the anode. The electrolyte enables the movement of metal ions between the cathode and the anode.

The flow path connection unit 130 connects the air intake apparatus 110 and the metal air battery module 120. To this end, the air intake apparatus 110 and the flow path connection unit 130 are connected to each other by the first flow path 171, while the flow path connection unit 130 and the metal air battery module 120 are connected to each other by the second flow path 172. In this state, the second flow path 172 is connected to the first opening 121 of the metal air battery module 120. Also, the second opening 122 of the metal air battery module 120 is connected to the flow path connection unit 130 by the third flow path 173. The fourth and fifth flow paths 174 and 175, respectively, fluidly connect the flow path connection unit 130 to the outside of the metal air battery system 200.

In the metal air battery system 200, the metal air battery module 120 performs a plurality of discharging reactions. As the discharging reactions are performed, the position of the oxygen inlet and the position of the oxygen outlet in the metal air battery module 120 may be reversed with respect to each other by the flow path connection unit 130. Also, the metal air battery module 120 performs charging reactions between discharging reactions. In the charging reactions, at least a portion of the oxygen remaining in the metal air battery module 120 may be removed by being exhausted to the outside by purging.

Figure 2A:
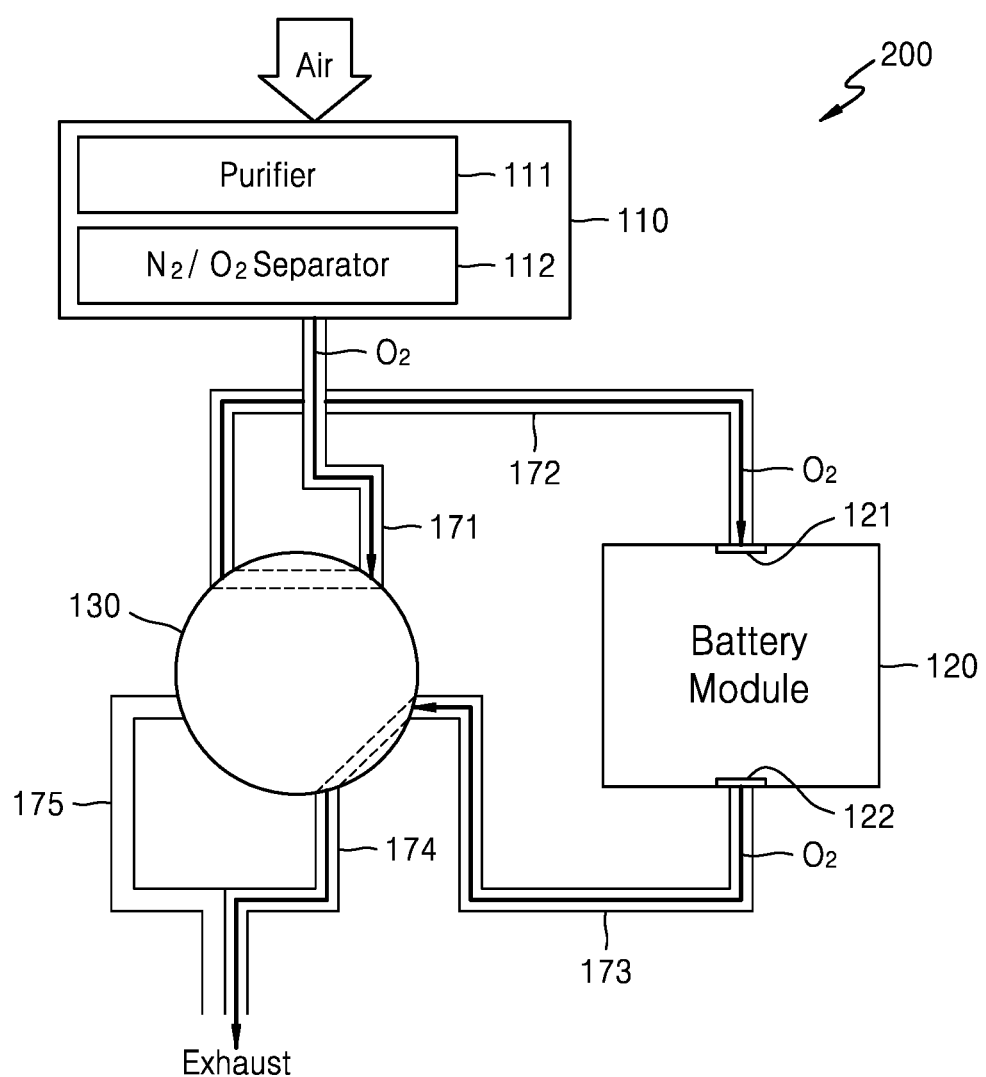
FIGS. 2A to 2E illustrate a metal air battery system and a method of operating the metal air battery system, according to another exemplary embodiment.
Figure 2B:
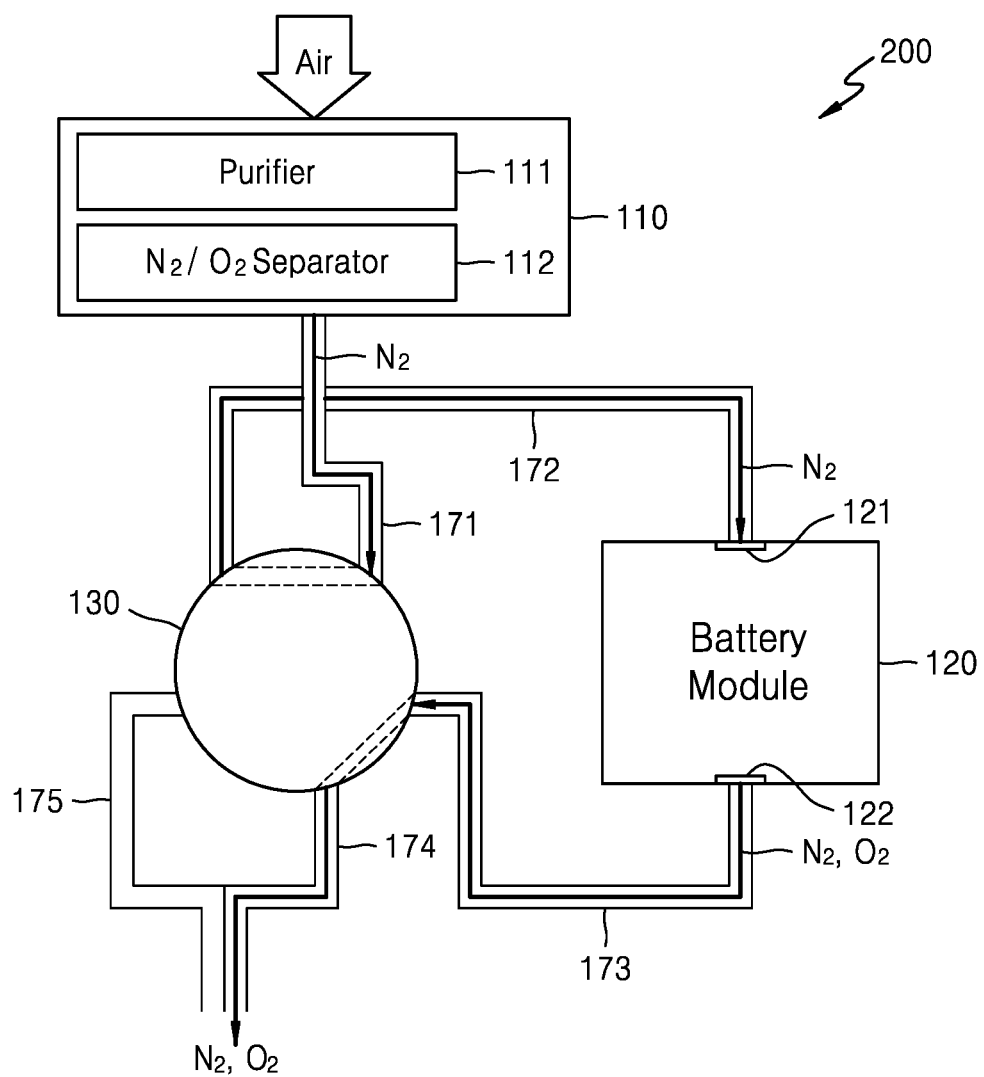
Figure 2C:
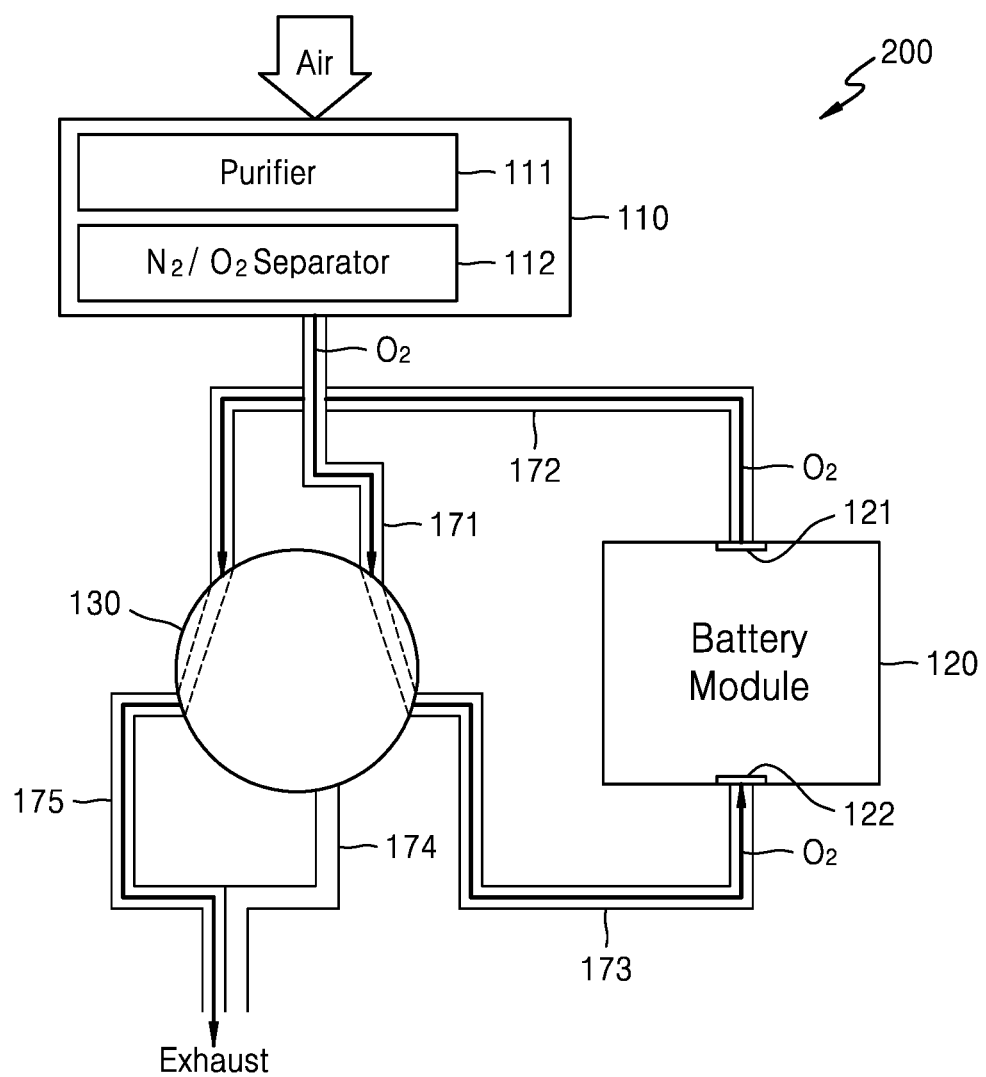
Figure 2D:
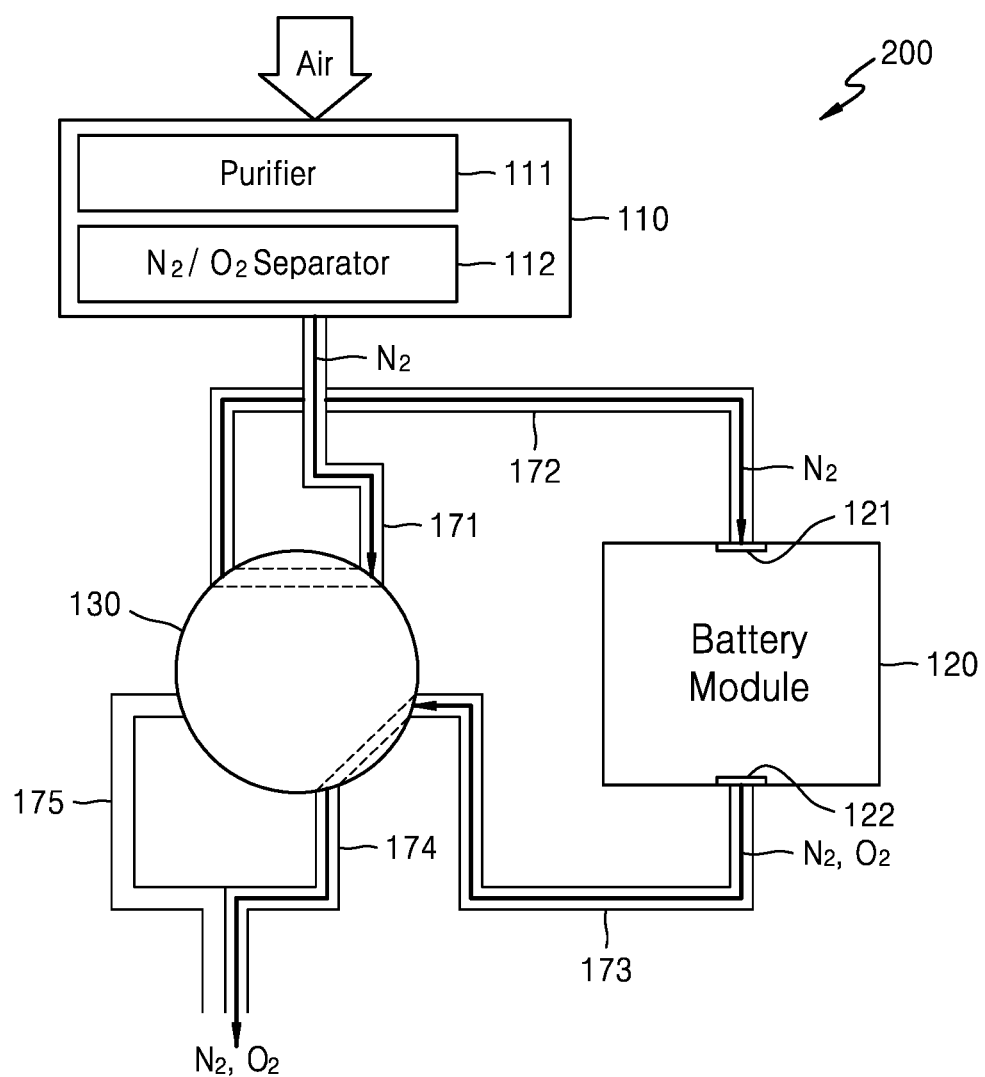
Figure 2E:
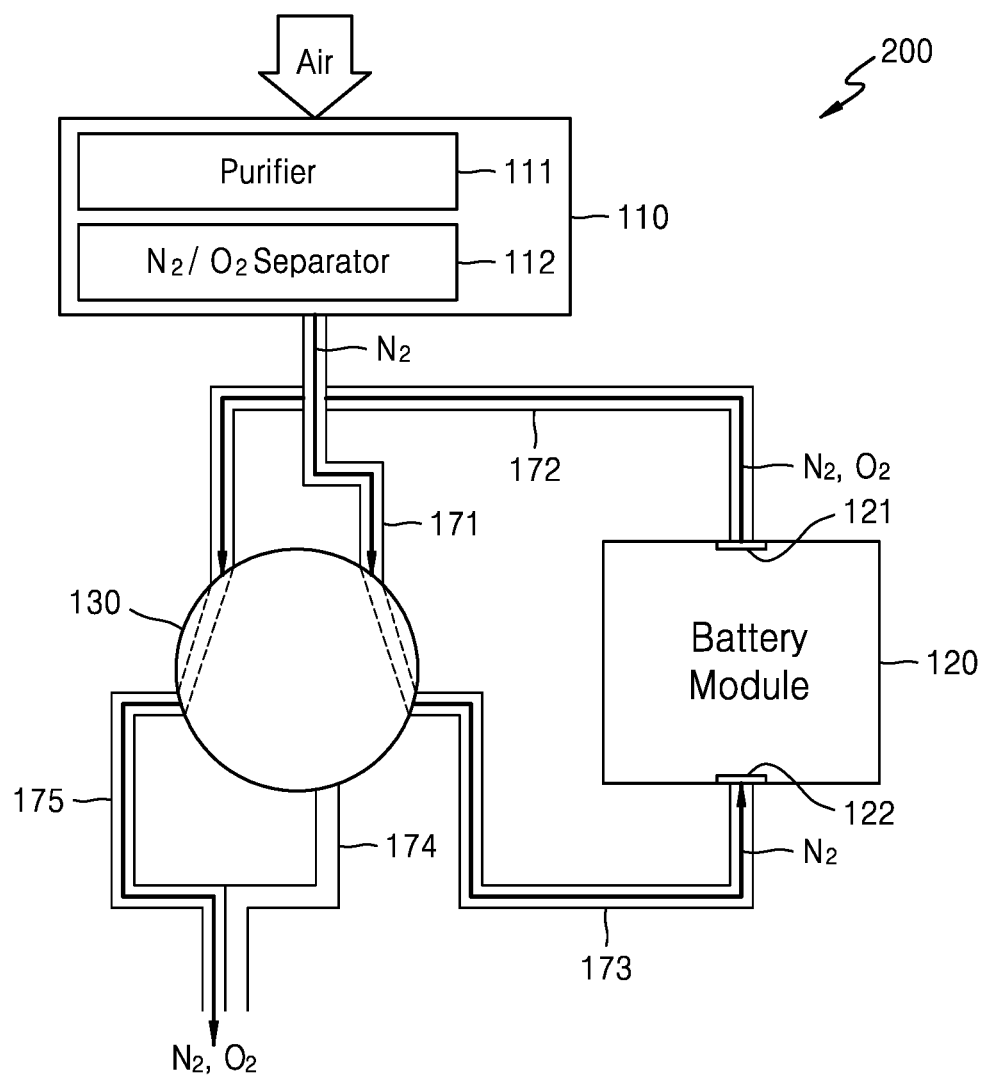

In the following description, the metal air battery system 200 and a method of operating the same are described with reference to FIGS. 2A to 2E. In further detail, FIG. 2A, and FIG. 2C illustrate a direction of flow through the metal air battery system 200 while the metal air battery module 120 performs a first discharging reaction and a second discharging reaction in the metal air battery system 200. FIGS. 2B and 2D illustrate a direction of flow through the metal air battery system 200 while the metal air battery module 120 performs a first charging reaction and a second charging reaction in the metal air battery system 200. FIG. 2E illustrates a modified example of the second charging reaction of FIG. 2D.

FIG. 2A illustrates a direction of flow of through the metal air battery system while the metal air battery module 120 performs a first discharging reaction in the metal air battery system 200. In this state, the flow path connection unit 130 connects the first flow path 171 and the second flow path 172, and fluidly connects the third flow path 173 and the fourth flow path 174.

Referring to FIG. 2A, when the air intake apparatus 110 is operated, the external air is drawn into the air intake apparatus 110. The purifier 111 purifies the air drawn into the air intake apparatus 110 and removes moisture from the purified air, and then the separator 112 separates the air into oxygen and nitrogen. Next, the separated oxygen is drawn into the flow path connection unit 130 via the first flow path 171. Since the flow path connection unit 130 connects the first flow path 171 and the second flow path 172, the oxygen drawn into the flow path connection unit 130 via the first flow path 171 is supplied to the metal air battery module 120 via the second flow path 172. In this state, the oxygen may flow in through the first opening 121 into the metal air battery module 120.

The metal air battery module 120 receiving a supply of oxygen through the first opening 121 performs a first discharging reaction. The unused oxygen remaining in the metal air battery module 120 following the discharging reaction is removed through the second opening 122. The oxygen removed through the second opening 122 is directed into the flow path connection unit 130 through the third flow path 173. Since the flow path connection unit 130 connects the third flow path 173 and the fourth flow path 174, the oxygen directed into the flow path connection unit 130 via the third flow path 173 may be exhausted to the outside via the fourth flow path 174.

As such, in a first discharging reaction process, the air intake apparatus 110 supplies oxygen to the metal air battery module 120 through the first opening 121, and the unused oxygen remaining in the metal air battery module 120 following the discharging reaction is exhausted to the outside through the second opening 122. Accordingly, in the first discharging reaction process, the first and second openings 121 and 122 may function as an oxygen inlet and an oxygen outlet, respectively.

FIG. 2B illustrates that, after the first discharging reaction, the metal air battery module 120 performs a first charging reaction in the metal air battery system 200. In this state, the flow path connection unit 130 connects the first flow path 171 and the second flow path 172, and fluidly connects the third flow path 173 and the fourth flow path 174.

Referring to FIG. 2B, after the first discharging reaction is performed, the metal air battery module 120 may perform a first charging reaction using an external electric power source. In the first charging reaction, portion of oxygen remaining in the metal air battery module 120 may be exhausted to the outside of the metal air battery system 200 by purging.

In detail, the external air is drawn into the air intake apparatus 110 by the operation of the air intake apparatus 110. The air is purified and then separated into oxygen and nitrogen. The nitrogen separated by the air intake apparatus 110 is exhausted from the separator via the first flow path 171, and the exhausted nitrogen is directed into the flow path connection unit 130. Since the flow path connection unit 130 connects the first flow path 171 and the second flow path 172, the nitrogen is directed into the flow path connection unit 130 via the first flow path 171 and is supplied to the metal air battery module 120 via the second flow path 172. In this state, the nitrogen may be flow through the first opening 121 into the metal air battery module 120. When the nitrogen is supplied to the inside of the metal air battery module 120, the portion of the oxygen remaining in the metal air battery module 120 may be exhausted to the outside by purging. In this state, the oxygen and the nitrogen are removed through the second opening 122 and directed into the flow path connection unit 130 via the third flow path 173. Since the flow path connection unit 130 connects the third flow path 173 and the fourth flow path 174, the oxygen and nitrogen directed into the flow path connection unit 130 via the third flow path 173 may then be exhausted to the outside via the fourth flow path 174.

FIG. 2C illustrates that the metal air battery module 120 performs a second discharging reaction in the metal air battery system 200. In this state, the flow path connection unit 130 connects the first flow path 171 and the third flow path 173, the second flow path 172 and the fifth flow path 175.

Referring to FIG. 2C, as the air intake apparatus 110 is operated, external air is drawn into the air intake apparatus 110. The purifier 111 purifies the air and removes moisture from the purified air, and the separator 112 separates the air into oxygen and nitrogen. Next, the separated oxygen is directed into the flow path connection unit 130 via the first flow path 171. Since the flow path connection unit 130 connects the first flow path 171 and the third flow path 173, the oxygen directed into the flow path connection unit 130 via the first flow path 171 is supplied to the inside of the metal air battery module 120 via the third flow path 173. In this state, the oxygen may be directed through the second opening 122 of the metal air battery module 120.

The metal air battery module 120 performs a second discharging reaction by receiving a supply of oxygen through the second opening 122. The unused oxygen remaining in the metal air battery module 120 following the second discharging reaction is exhausted through the first opening 121 and is directed into the flow path connection unit 130 via the second flow path 172. Since the flow path connection unit 130 connects the second flow path 172 and the fifth flow path 175, the oxygen directed into the flow path connection unit 130 via the second flow path 172 may be exhausted to the outside of the metal air battery system 200 via the fifth flow path 175.

As such, in the second discharging reaction process, the air intake apparatus 110 supplies the oxygen to the metal air battery module 120 through the second opening 122, and the unused oxygen remaining in the metal air battery module 120 following the second discharging reaction is exhausted to the outside through the first opening 121. Accordingly, in the second discharging reaction process, unlike the first discharging reaction process, the first and second openings 121 and 122 may function as an oxygen outlet and an oxygen inlet, respectively.

Referring to FIG. 2D, after the second discharging reaction process, the metal air battery module 120 performs a second charging reaction in the metal air battery system 200. In this state, the flow path connection unit 130 connects the first flow path 171 and the third flow path 173.

The second charging reaction process of the metal air battery module 120 in FIG. 2D is the same as described for the first charging reaction process of the metal air battery module 120 in FIG. 2B. Accordingly, in the second charging reaction process, at least a portion of the oxygen remaining in the metal air battery module 120 may be removed as the air intake apparatus 110 supplies the nitrogen to the metal air battery module 120 through the first opening 121. That is, the oxygen is purged from the metal air battery module 120 by the inflow of nitrogen into the metal air battery module 120. In this state, any oxygen and nitrogen remaining in the metal air battery module 120 may be exhausted to the outside through the second opening 122.

FIG. 2E illustrates a modified example of the second charging reaction of FIG. 2D. In this state, the flow path connection unit 130 connects the first flow path 171 and the third flow path 173, and fluidly connects the second flow path 172 and the fifth flow path 175.

Referring to FIG. 2E, the external air is drawn into the air intake apparatus 110 by the operation of the air intake apparatus 110, and the drawn air is purified and then separated into oxygen and nitrogen. The nitrogen separated by the air intake apparatus 110 is exhausted via the first flow path 171 and directed into the flow path connection unit 130. Since the flow path connection unit 130 connects the first flow path 171 and the third flow path 173, the nitrogen drawn into the flow path connection unit 130 via the first flow path 171 is supplied to the inside of the metal air battery module 120 via the third flow path 173. In this state, the nitrogen may be directed into the metal air battery module 120 through the second opening 122. As such, when the nitrogen is supplied to the inside of the metal air battery module 120, of the portion of the oxygen remaining in the metal air battery module 120 may be purged from the metal air battery module 120. In this process, the oxygen and nitrogen are removed from the metal air battery module through the first opening 121, and the exhausted oxygen and nitrogen are directed into the flow path connection unit 130. Since the flow path connection unit 130 connects the second flow path 172 and the fifth flow path 175, the oxygen and nitrogen directed into the flow path connection unit 130 via the second flow path 172 may be exhausted to the outside via the fifth flow path 175.

As such, in the second charging reaction process of FIG. 2E, as the air intake apparatus 110 supplies the nitrogen to the metal air battery module 120 through the second opening 122, at least a portion of the oxygen remaining in the metal air battery module 120 may be exhausted to the outside through the first opening 121.

In the above description, an embodiment is described in which the position of the oxygen inlet and the position of the oxygen outlet are reversed as the process is shifted from the first discharging reaction process to the second discharging reaction process. However, the present disclosure is not limited thereto and, during the first discharging process or the second discharging process, the position of the oxygen inlet and the position of the oxygen outlet may be reversed to be the opposite of that which was previously described. In other words, as the discharge processes are performed, the position of the oxygen inlet and the position of the oxygen outlet may be reversed in various ways.

According to an exemplary embodiment, the metal air battery system 100 may alternately and repeatedly perform the discharging reactions and the charging reactions. In this state, as the metal air battery module 120 performs the discharging reactions, the position of the oxygen inlet and the position of the oxygen outlet in the metal air battery module 120 are alternately reversed. Accordingly, the lifespan of the metal air battery module 120 may be increased. Also, the metal air battery module 120 performs charging reactions between the discharging reactions. In the charging reaction process, at least a portion of the oxygen remaining in the metal air battery module 120 may be purged from the metal air battery module 120 as the air intake apparatus 110 supplies nitrogen to the metal air battery module 120. Accordingly, the deterioration of cells due to the presence of oxygen remaining in the metal air battery module 120 may be prevented and the lifespan of the metal air battery module 120 may be increased.

FIGS. 3A to 3E illustrate a metal air battery system 300 and a method of operating the same, according to another exemplary embodiment.

Referring to FIGS. 3A to 3E, the metal air battery system 300 may include the air intake apparatus 110, the metal air battery module 120, the flow path connection unit 130, and a vacuum pump 140. The air intake apparatus 110 draws in external air during a discharging reaction. The air intake apparatus 110 may include the purifier 111 for purifying the drawn air and removing moisture from the air, and the separator 112 for separating the purified air into oxygen and nitrogen.

The metal air battery module 120 may perform a discharging reaction by receiving a supply of oxygen from the air intake apparatus 110. The first and second openings 121 and 122, through which oxygen is drawn in or exhausted, are disposed in the metal air battery module 120. The metal air battery module 120 may include a plurality of cells (not shown) that are connected in series, in parallel, or in a combination of series and parallel. Each of the cells performs a discharging reaction using the oxygen supplied from the air intake apparatus 110. Each of the cells may include a cathode, an anode, and an electrolyte. An oxidation-reduction reaction of oxygen occurs at the cathode using oxygen as an active material, while an oxidation-reduction reaction of metal is generated at the anode. The electrolyte enables the movement of metal ions between the cathode and the anode.

The flow path connection unit 130 connects the air intake apparatus 110 and the metal air battery module 120. To this end, the air intake apparatus 110 and the flow path connection unit 130 are fluidly connected to each other by the first flow path 171, while the flow path connection unit 130 and the metal air battery module 120 are fluidly connected to each other by the second flow path 172. In this state, the second flow path 172 is fluidly connected to the first opening 121 of the metal air battery module 120. Alternatively, the second opening 122 of the metal air battery module 120 is fluidly connected to the flow path connection unit 130 via the third flow path 173. The fourth and fifth flow paths 174 and 175 fluidly connect the flow path connection unit 130 to the outside. Further, the flow path connection unit 130 and the vacuum pump 140 are fluidly connected by a sixth flow path 176. The flow path connection unit 130 may be configured to selectively connect two or more of the first, second, third, fourth, fifth, and sixth flow paths 171, 172, 173, 174, 175, and 176, respectively, as desired.

The vacuum pump 140 removes at least a portion of the oxygen remaining in the metal air battery module 120 following the charging reaction process by applying a vacuum. The vacuum pump 140 may be connected to the flow path connection unit 130 via the sixth flow path 176.

In the metal air battery system 300, the metal air battery module 120 performs a plurality of discharging reactions, and as the discharging reactions are performed, the position of the oxygen inlet and the position of the oxygen outlet in the metal air battery module 120 may be reversed (i.e. alternated) by the flow path connection unit 130. Also, the metal air battery module 120 performs charging reactions between the discharging reactions. In the charging reactions, at least a portion of the oxygen remaining in the metal air battery module 120 may be removed by being exhausted to the outside by the operation of the vacuum pump 140.

Figure 3A:
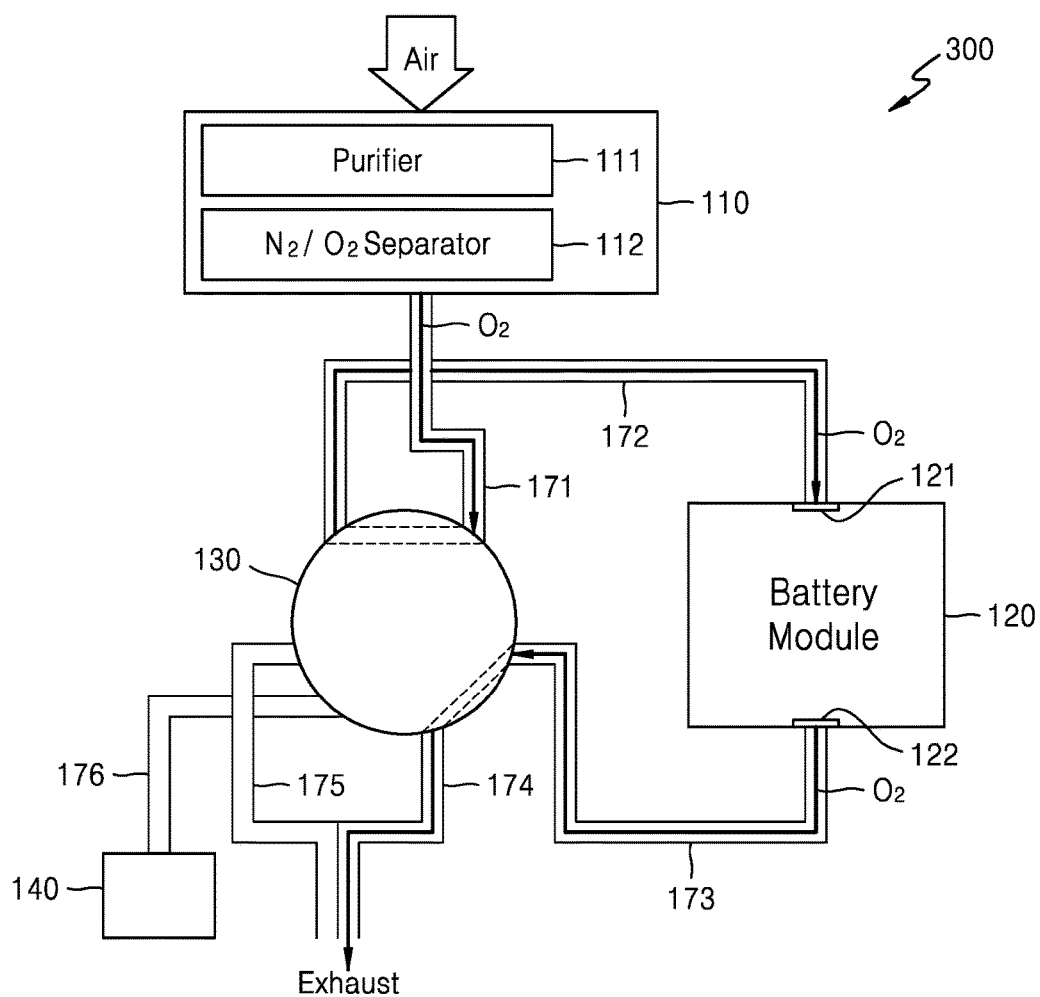
FIGS. 3A to 3E illustrate a metal air battery system and a method of operating the metal air battery system, according to yet another exemplary embodiment.
Figure 3B:
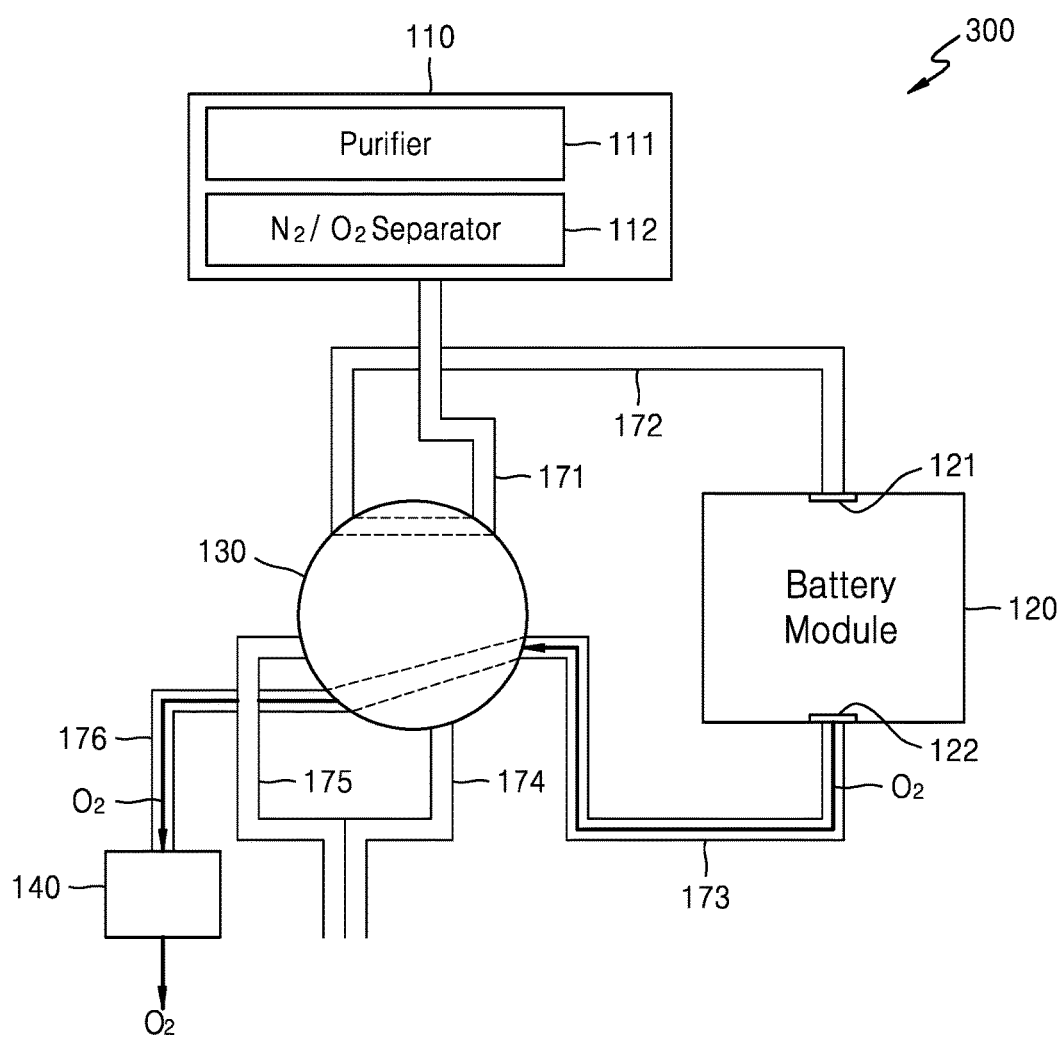
Figure 3C:
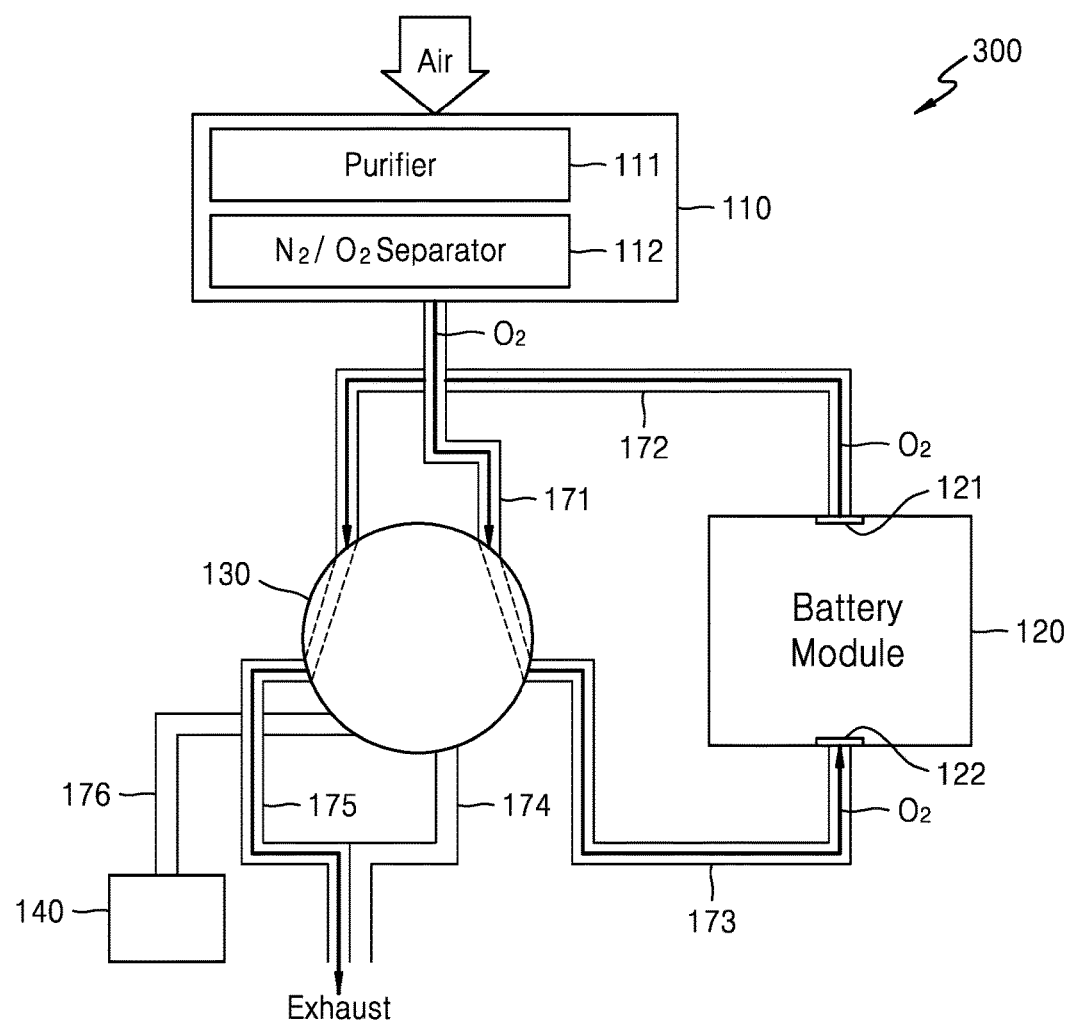
Figure 3D:
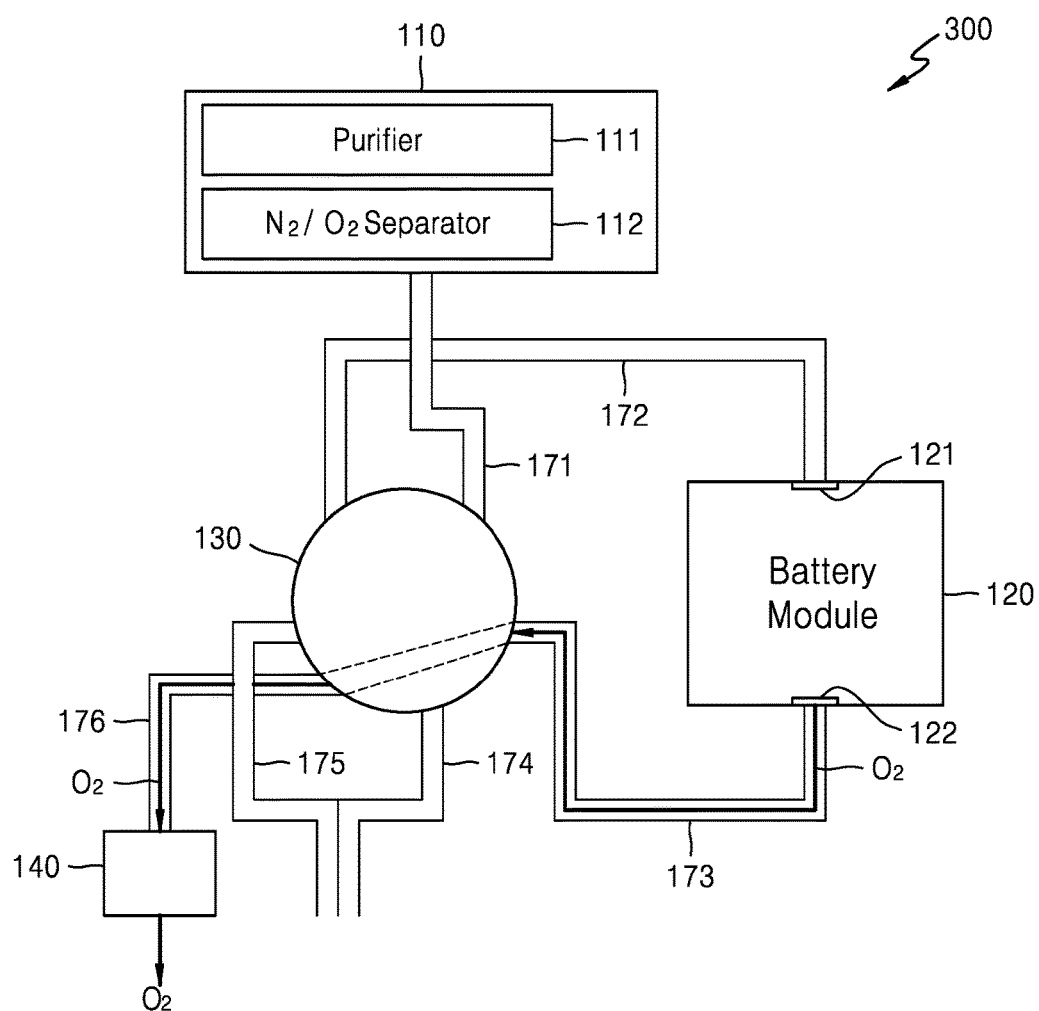
Figure 3E:
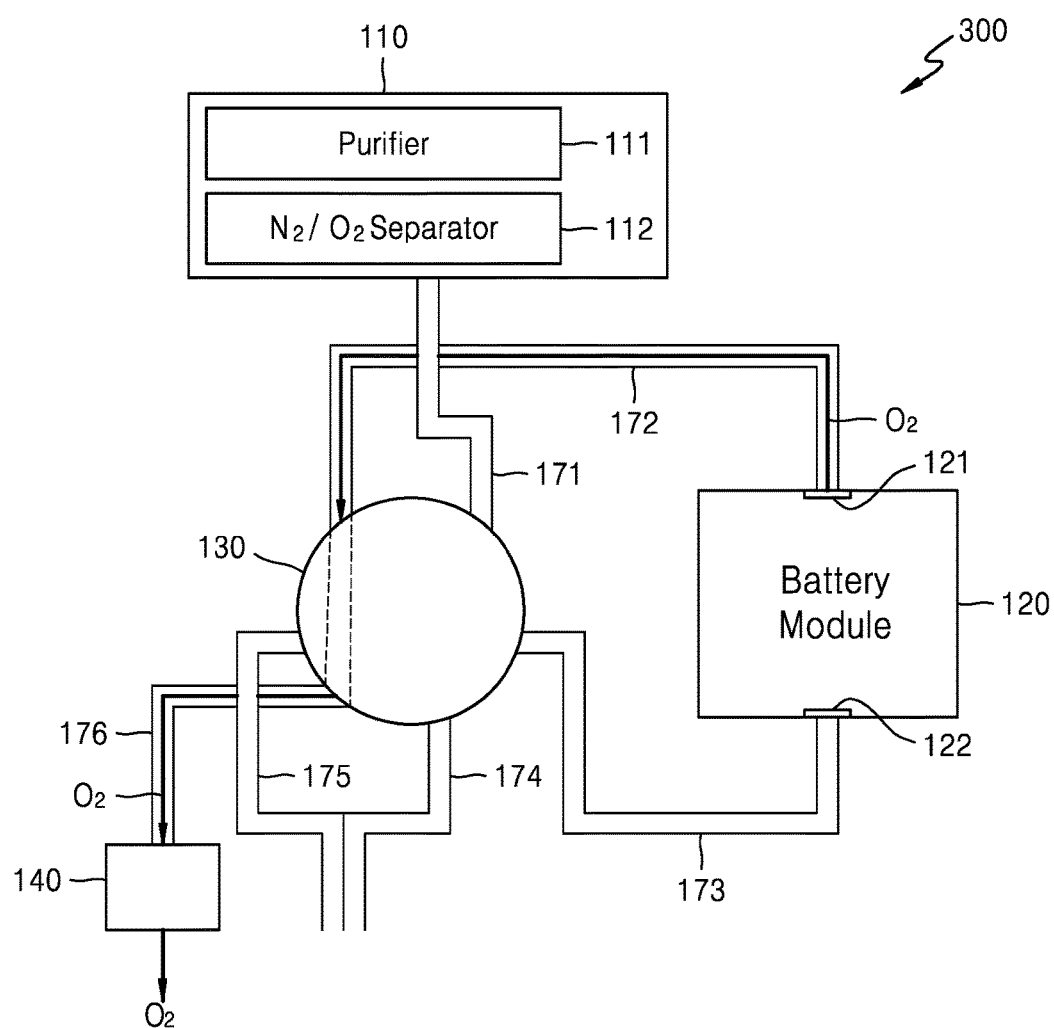

In the following description, the metal air battery system 300 and a method of operating the same are described with reference to FIGS. 3A to 3E. In detail, FIGS. 3A and 3C illustrate a direction of oxygen flow through the metal air battery system 300 while the metal air battery module 120 performs a first discharging reaction and a second discharging reaction in the metal air battery system 300, respectively. FIGS. 3B and 3D illustrate a direction of oxygen flow through the metal air battery system 300 while the metal air battery module 120 performs a first charging reaction and a second charging reaction in the metal air battery system 300, respectively. FIG. 3E illustrates a modified example of the second charging reaction of FIG. 3D.

FIG. 3A illustrates a direction of oxygen flow through the metal air battery system 300 while the metal air battery module 120 performs a first discharging reaction in the metal air battery system 300. In this state, the flow path connection unit 130 connects the first flow path 171 and the second flow path 172, and fluidly connects the third flow path 173 and the fourth flow path 174.

Referring to FIG. 3A, when the air intake apparatus 110 is operated, the external air is drawn into the air intake apparatus 110. The purifier 111 purifies the air drawn into the air intake apparatus 110 and removes moisture from the purified air, and then the separator 112 separates the air into oxygen and nitrogen. Next, the separated oxygen is directed into the flow path connection unit 130 via the first flow path 171. Since the flow path connection unit 130 connects the first flow path 171 and the second flow path 172, the oxygen directed into the flow path connection unit 130 via the first flow path 171 is supplied to the inside of the metal air battery module 120 via the second flow path 172. In this state, the oxygen may be flow in through the first opening 121 into the metal air battery module 120.

The metal air battery module 120 receiving a supply of oxygen through the first opening 121 performs a first discharging reaction. The unused oxygen remaining in the metal air battery module 120 following the first discharging reaction is exhausted through the second opening 122. The oxygen exhausted through the second opening 122 is directed into the flow path connection unit 130 through the third flow path 173. Since the flow path connection unit 130 connects the third flow path 173 and the fourth flow path 174, the oxygen directed into the flow path connection unit 130 via the third flow path 173 may be exhausted to the outside via the fourth flow path 174.

As such, in a first discharging reaction process, the air intake apparatus 110 supplies oxygen to the metal air battery module 120 through the first opening 121, and the unused oxygen remaining in the metal air battery module 120 following the first discharging reaction is exhausted to the outside through the second opening 122. Accordingly, in the first discharging reaction process, the first and second openings 121 and 122 may function as an oxygen inlet and an oxygen outlet, respectively.

FIG. 3B illustrates that, after the first discharging reaction, the metal air battery module 120 performs a first charging reaction in the metal air battery system 300. In this state, the flow path connection unit 130 connects the third flow path 173 and the sixth flow path 176.

Referring to FIG. 3B, after the first discharging reaction is performed, the metal air battery module 120 may perform a first charging reaction using an external electric power source. In the first charging reaction, at least a portion of the unused oxygen remaining in the metal air battery module 120 may be removed by a vacuum pump 140. In other words, operation of the vacuum pump 140 removes at least a portion of the oxygen remaining in the metal air battery module 120 through the second opening 122, and the removed oxygen is directed into the flow path connection unit 130 via the third flow path 173. Since the flow path connection unit 130 connects the third flow path 173 and the sixth flow path 176, the oxygen directed into the flow path connection unit 130 via the third flow path 173 may be directed toward the vacuum pump 140 via the sixth flow path 176.

FIG. 3C illustrates that the metal air battery module 120 performs a second discharging reaction in the metal air battery system 300. In this state, the flow path connection unit 130 connects the first flow path 171 and the third flow path 173, and fluidly connects the second flow path 172 and the fifth flow path 175.

Referring to FIG. 3C, operation of the air intake apparatus 110 causes the external air to be drawn into the air intake apparatus 110. The purifier 111 purifies the air in the air intake apparatus 110 and removes moisture from the purified air, and the separator 112 separates the air into oxygen and nitrogen. Next, the separated oxygen is directed into the flow path connection unit 130 via the first flow path 171. Since the flow path connection unit 130 connects the first flow path 171 and the third flow path 173, the oxygen directed into the flow path connection unit 130 via the first flow path 171 is supplied to the metal air battery module 120 via the third flow path 173. In this state, the oxygen may flow into the metal air battery module 120 through the second opening 122 of the metal air battery module 120.

The metal air battery module 120 performs a second discharging reaction by receiving a supply of oxygen through the second opening 122. The unused oxygen remaining in the metal air battery module 120 after the second discharging reaction is removed through the first opening 121. The oxygen removed through the first opening 121 is directed into the flow path connection unit 130 via the second flow path 172. Since the flow path connection unit 130 connects the second flow path 172 and the fifth flow path 175, the oxygen directed into the flow path connection unit 130 via the second flow path 172 may be exhausted to the outside via the fifth flow path 175.

As such, in the second discharging reaction process, the air intake apparatus 110 supplies oxygen to the metal air battery module 120 through the second opening 122, and the unused oxygen remaining in the metal air battery module 120 following the second discharging reaction is exhausted to the outside through the first opening 121. Accordingly, in the second discharging reaction process, unlike the first discharging reaction process, the first and second openings 121 and 122 may function as an oxygen outlet and an oxygen inlet, respectively.

FIG. 3D illustrates that, after the second discharging reaction, the metal air battery module 120 performs a second charging reaction in the metal air battery system 300. In this state, the flow path connection unit 130 connects the third flow path 173 and the sixth flow path 176 to each other.

The second charging reaction process of the metal air battery module 120 of FIG. 3D is the same as described for the first charging reaction process of the metal air battery module 120 of FIG. 3B. Accordingly, in the second charging reaction, at least a portion of the oxygen remaining in the metal air battery module 120 may be removed by being exhausted to the outside through the second opening 122 by the operation of the vacuum pump 140.

FIG. 3E illustrates a modified example of the second charging reaction of FIG. 3D. In this state, the flow path connection unit 130 connects the second flow path 172 and the sixth flow path 176 to each other.

Referring to FIG. 3E, in the second charging reaction process, at least a portion of the oxygen remaining in the metal air battery module 120 may be removed by the vacuum pump 140. In other words, when operating the vacuum pump 140, at least a portion of the oxygen remaining in the metal air battery module 120 is exhausted through the first opening 121, and the exhausted oxygen is directed into the flow path connection unit 130 via the second flow path 172. Since the flow path connection unit 130 connects the second flow path 172 and the sixth flow path 176, the oxygen directed into the flow path connection unit 130 via the second flow path 172 may be directed toward the vacuum pump 140 via the sixth flow path 176.

As such, an embodiment in which the position of the oxygen inlet and the position of the oxygen outlet are reversed as the process is shifted from the first discharging reaction to the second discharging reaction is described. However, the present disclosure is not limited thereto and, during the first discharging process or second discharging process, the position of the oxygen inlet and the position of the oxygen outlet may be reversed to be opposite that which was previously described. In other words, as the discharging reactions are performed, the position of the oxygen inlet and the position of the oxygen outlet may be alternately reversed in various ways.

According to an exemplary embodiment, the metal air battery system 300 may alternately and repeatedly perform the discharging reactions and the charging reactions. In this state, as the metal air battery module 120 performs discharging reactions, the position of the oxygen inlet and the position of the oxygen outlet are alternately reversed with each other in the metal air battery module 120. Accordingly, the lifespan of the metal air battery module 120 may be increased. Also, the metal air battery module 120 performs charging reactions between the discharging reactions. In the charging reaction process, at least a portion of the oxygen remaining in the metal air battery module 120 may be removed to the outside by the vacuum pump 140. Accordingly, since the deterioration due to the oxygen remaining in the metal air battery module 120 is prevented, the lifespan of the metal air battery module 120 may be increased.

FIGS. 4A to 4E illustrate a metal air battery system 400 and a method of operating the same, according to another exemplary embodiment.

Referring to FIGS. 4A to 4E, the metal air battery system 400 may include the air intake apparatus 110, the metal air battery module 120, the flow path connection unit 130, and an inert gas supply unit 150. The air intake apparatus 110 draws in external air during a discharging reaction. The air intake apparatus 110 may include the purifier 111 for purifying the drawn air and for removing moisture from the air, and the separator 112 for separating the purified air into oxygen and nitrogen.

The metal air battery module 120 may perform a discharging reaction by receiving a supply of oxygen from the air intake apparatus 110. The first and second openings 121 and 122, through which oxygen flows in or flows out, are formed in the metal air battery module 120. The metal air battery module 120 may include a plurality of cells (not shown) that are connected in series, in parallel, or in a combination of series and parallel. Each of the cells performs a discharging reaction using the oxygen supplied from the air intake apparatus 110. Each of the cells may include a cathode, an anode, and an electrolyte. An oxidation-reduction reaction of oxygen occurs at the cathode using oxygen as an active material, whereas an oxidation-reduction reaction of metal occurs at the anode. The electrolyte enables movement of metal ions between the cathode and the anode.

The flow path connection unit 130 connects the air intake apparatus 110 and the metal air battery module 120. To this end, the air intake apparatus 110 and the flow path connection unit 130 are fluidly connected by the first flow path 171, whereas the flow path connection unit 130 and the metal air battery module 120 are fluidly connected by the second flow path 172. In this state, the second flow path 172 is fluidly connected to the first opening 121 of the metal air battery module 120. Alternatively, the second opening 122 of the metal air battery module 120 is fluidly connected to the flow path connection unit 130 via the third flow path 173. The fourth and fifth flow paths 174 and 175 fluidly connect the flow path connection unit 130 to the outside of the metal air battery system 400. Also, the flow path connection unit 130 and the inert gas supply unit 150 are fluidly connected to each other by the sixth flow path 176. The flow path connection unit 130 may be configured to selectively connect two or more of the first, second, third, fourth, fifth, and sixth flow paths 171, 172, 173, 174, 175, and 176, as necessary.

Figure 4A:
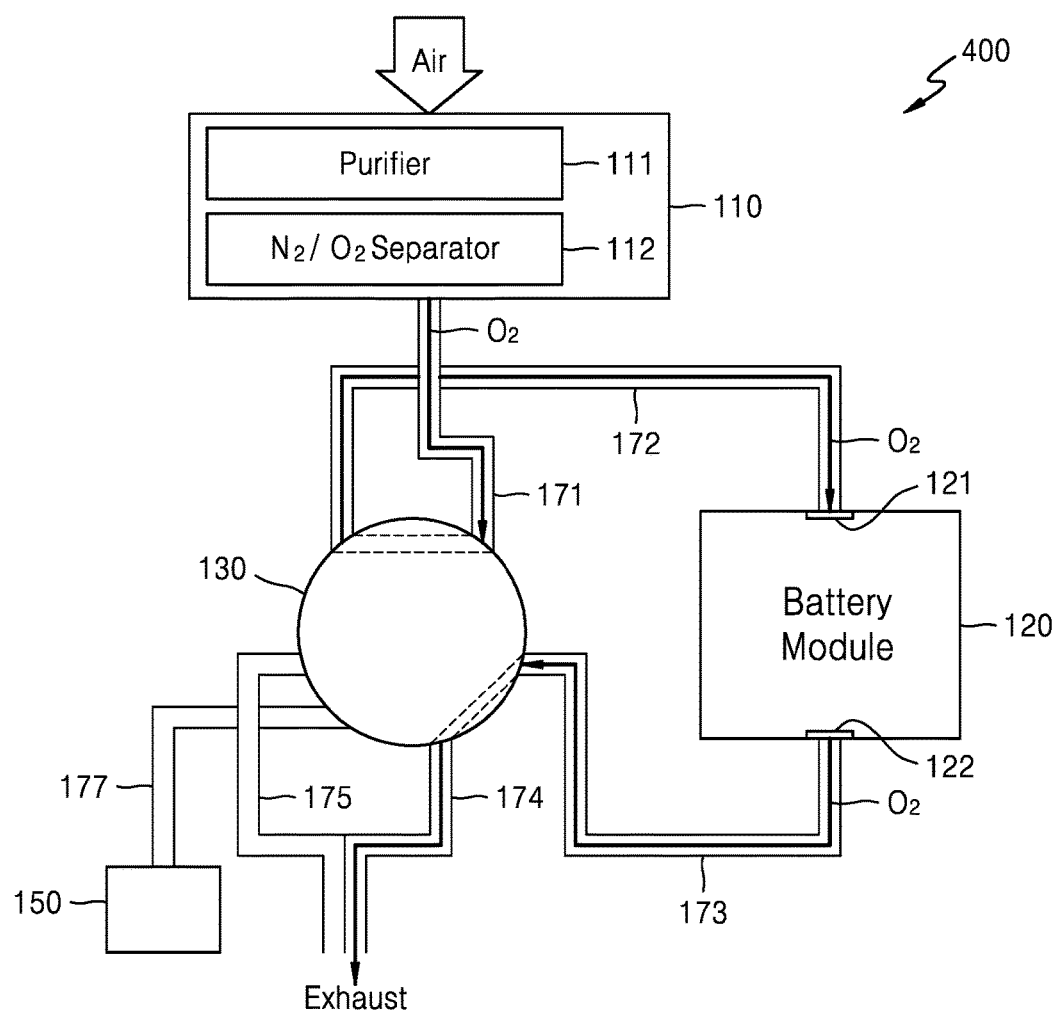
FIGS. 4A to 4E illustrate a metal air battery system and a method of operating the metal air battery system, according to another exemplary embodiment.
Figure 4B:
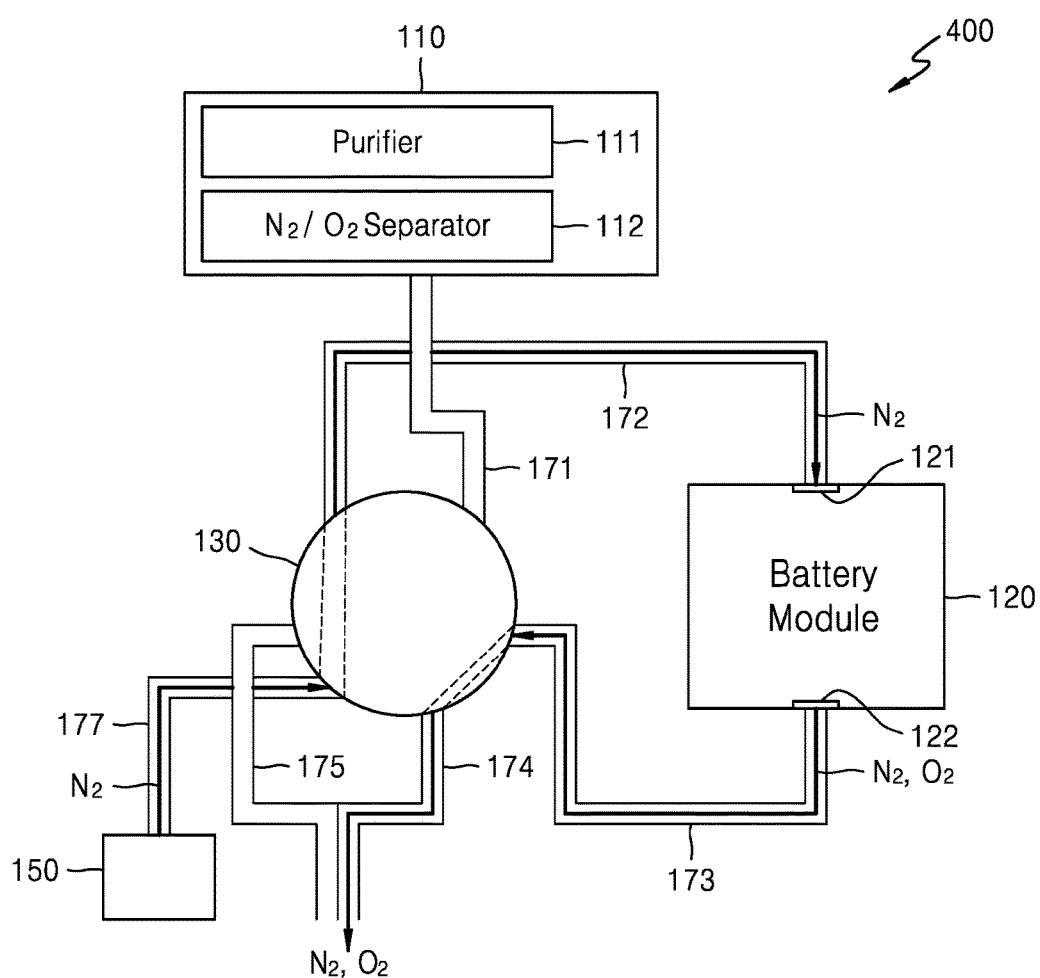
Figure 4C:
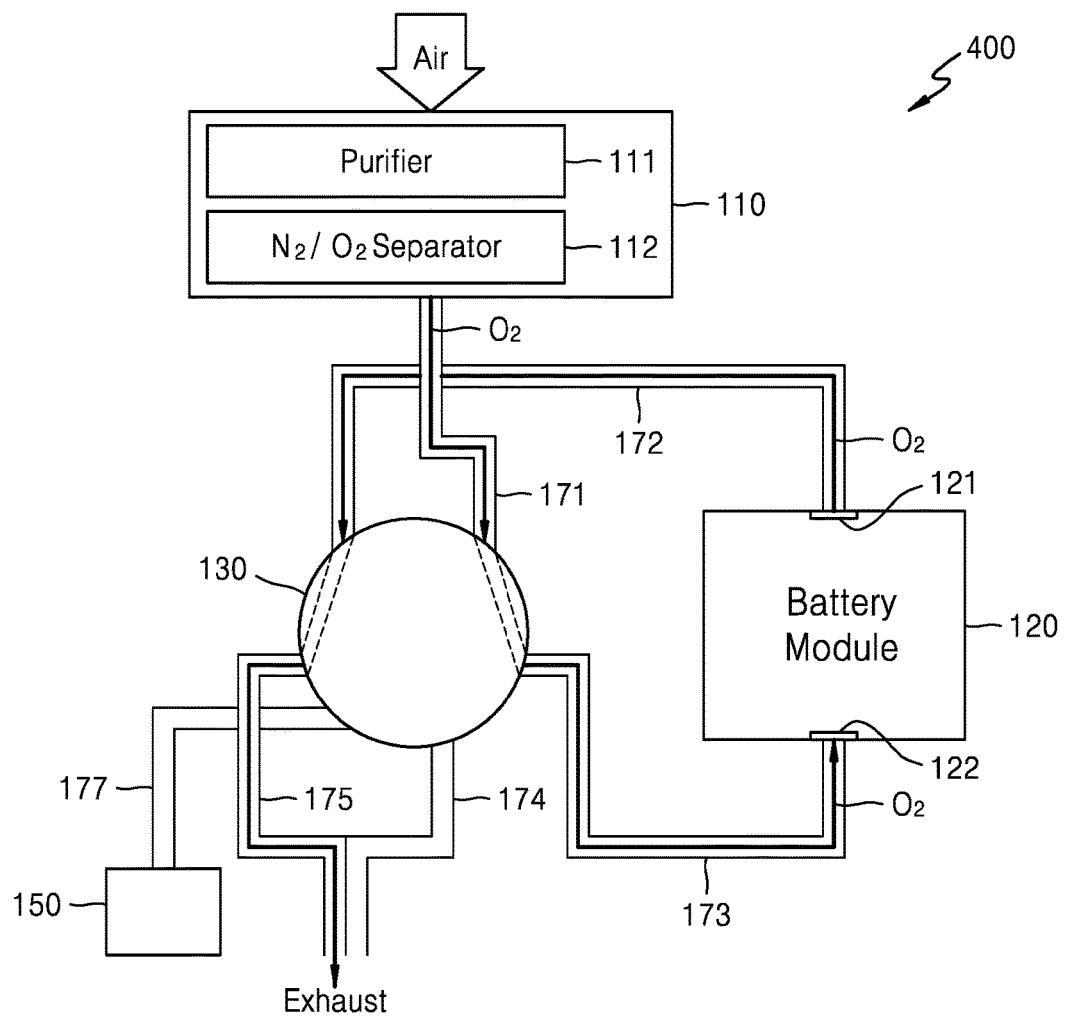
Figure 4D:
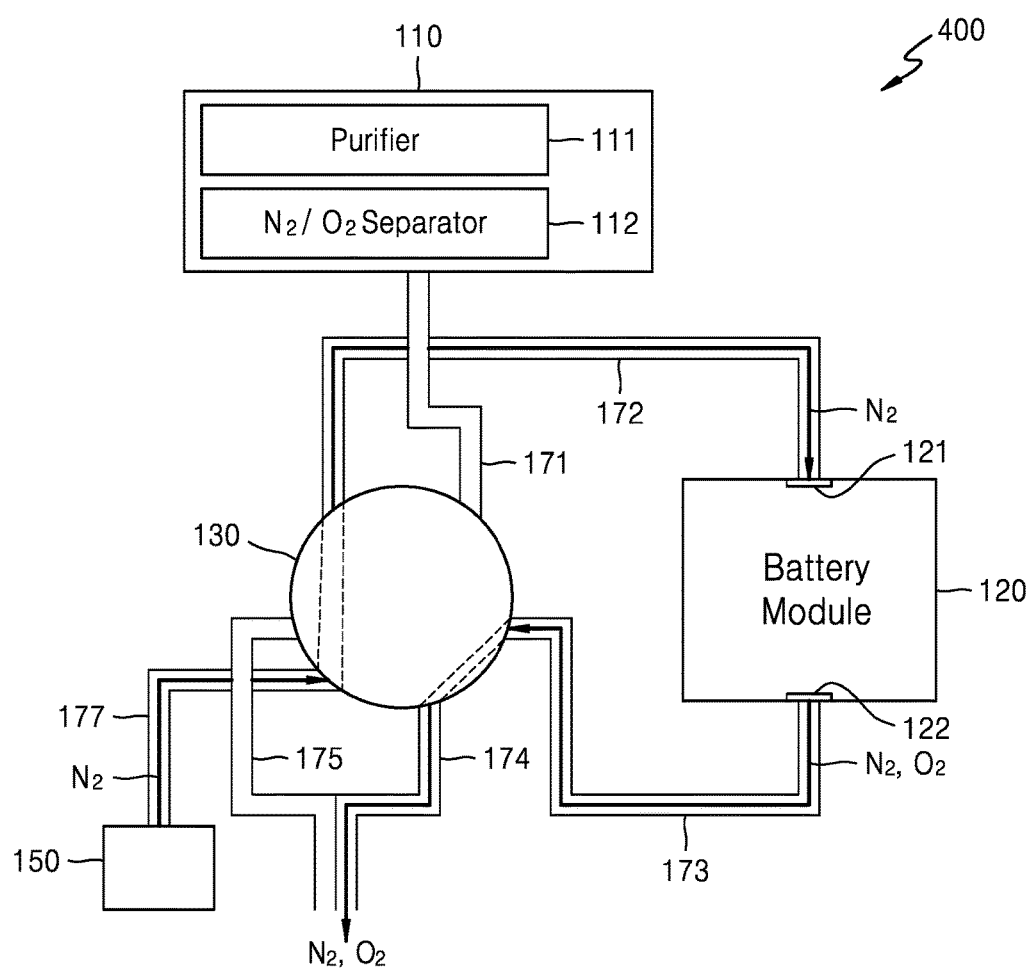
Figure 4E:
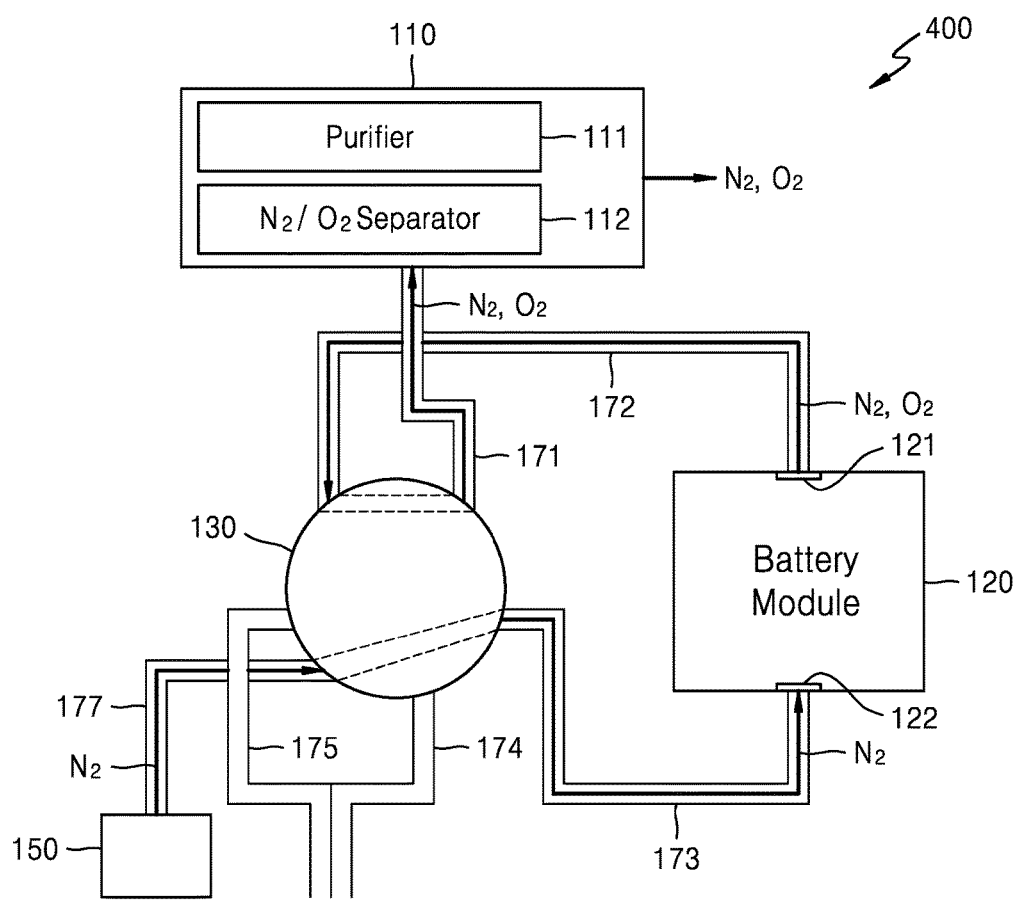

The inert gas supply unit 150 removes at least a portion of the oxygen remaining in the metal air battery module 120 by purging the oxygen from the metal air battery module 120. The purging is accomplished by supplying an inert gas to the metal air battery module 120 during a charging reaction. The inert gas may include at least one of nitrogen ($N_2$), argon (Ar), or helium (He), but is not limited thereto. FIGS. 4B, 4D, and 4E illustrate an exemplary embodiment using nitrogen as the inert gas. The inert gas supply unit 150 may be fluidly connected to the flow path connection unit 130 via the sixth flow path 176.

In the metal air battery system 400, the metal air battery module 120 performs a plurality of discharging reactions, and as the discharging reactions are performed, the position of the oxygen inlet and the position of the oxygen outlet in the metal air battery module 120 may be alternately reversed by the flow path connection unit 130. Also, the metal air battery module 120 performs charging reactions between discharging reactions. In the charging reactions, at least a portion of the oxygen remaining in the metal air battery module 120 may be removed by being exhausted to the outside by the operation of the inert gas supply unit 150.

In the following description, the metal air battery system 400 and a method of operating the same are described with reference to FIGS. 4A to 4E. In detail, FIGS. 4A and 4C illustrate a direction of flow through the metal air battery system while the metal air battery module 120 performs a first discharging reaction and a second discharging reaction in the metal air battery system 400. FIGS. 4B and 4D illustrates a direction of flow through the metal air battery system while the metal air battery module 120 performs a first charging reaction and a second charging reaction in the metal air battery system 400. FIG. 4E illustrates a modified example of the second charging reaction of FIG. 4D.

FIG. 4A illustrates a direction of flow through the metal air battery system while the metal air battery module 120 performs a first discharging reaction in the metal air battery system 400. In this state, the flow path connection unit 130 connects the first flow path 171 and the second flow path 172, and connects the third flow path 173 and the fourth flow path 174.

Referring to FIG. 4A, when the air intake apparatus 110 is operated, the external air is drawn into the air intake apparatus 110. The purifier 111 purifies the air drawn into the air intake apparatus 110 and removes moisture from the purified air, and then the separator 112 separates the air into oxygen and nitrogen. Next, the separated oxygen is directed into the flow path connection unit 130 via the first flow path 171. Since the flow path connection unit 130 fluidly connects the first flow path 171 and the second flow path 172, the oxygen directed into the flow path connection unit 130 via the first flow path 171 is supplied to the inside of the metal air battery module 120 via the second flow path 172. In this state, the oxygen may be flow in through the first opening 121 into the metal air battery module 120.

The metal air battery module 120 receiving a supply of oxygen through the first opening 121 performs a first discharging reaction. The unused oxygen remaining in the metal air battery module 120 after the first discharging reaction is removed through the second opening 122. The oxygen removed through the second opening 122 is directed into the flow path connection unit 130 through the third flow path 173. Since the flow path connection unit 130 connects the third flow path 173 and the fourth flow path 174, the oxygen directed into the flow path connection unit 130 via the third flow path 173 may be exhausted to the outside via the fourth flow path 174.

As such, in a first discharging reaction process, the air intake apparatus 110 supplies oxygen to the metal air battery module 120 through the first opening 121, and the unused oxygen remaining in the metal air battery module 120 following the first discharging reaction is exhausted to the outside through the second opening 122. Accordingly, in the first discharging reaction process, the first and second openings 121 and 122 may function as an oxygen inlet and an oxygen outlet, respectively.

FIG. 4B illustrates that, after the first discharging reaction, the metal air battery module 120 performs a first charging reaction in the metal air battery system 400. In this state, the flow path connection unit 130 connects the second flow path 172 and the sixth flow path 177, and the third flow path 173 and the fourth flow path 174.

Referring to FIG. 4B, after the first discharging reaction is performed, the metal air battery module 120 may perform a first charging reaction using an external electric power source. In the first charging reaction, the portion of oxygen remaining in the metal air battery module 120 may be exhausted to the outside by purging.

In detail, due to the operation of the inert gas supply unit 150, an inert gas such as nitrogen is directed into the flow path connection unit 130 via the sixth flow path 177. Since the flow path connection unit 130 connects the sixth flow path 177 and the second flow path 172, the inert gas directed into the flow path connection unit 130 via the sixth flow path 177 may be supplied to the inside of the metal air battery module 120 via the second flow path 172. In this state, the inert gas may be flow in through the first opening 121 of the metal air battery module 120. As such, when the inert gas is supplied to the inside of the metal air battery module 120, at least part of the oxygen remaining in the metal air battery module 120 may be exhausted to the outside by purging. That is, the oxygen is purged from the metal air battery module 120 by the inflow of nitrogen into the metal air battery module 120. In this process, any oxygen and inert gas remaining in the metal air battery module 120 are then removed from the metal air battery module 120 through the second opening 122, and the exhausted oxygen and inert gas are directed into the flow path connection unit 130 via the third flow path 173. Since the flow path connection unit 130 connects the third flow path 173 and the fourth flow path 174, the oxygen and inert gas directed into the flow path connection unit 130 via the third flow path 173 may be exhausted to the outside through the fourth flow path 174.

FIG. 4C illustrates that the metal air battery module 120 performs a second discharging reaction in the metal air battery system 400. In this state, the flow path connection unit 130 connects the first flow path 171 and the third flow path 173, and fluidly connects the second flow path 172 and the fifth flow path 175.

Referring to FIG. 4C, the air intake apparatus draws in external air. The purifier 111 purifies the air drawn into the air intake apparatus 110 and removes moisture from the purified air, and then the separator 112 separates the air into oxygen and nitrogen. Next, the separated oxygen is directed into the flow path connection unit 130 via the first flow path 171. Since the flow path connection unit 130 connects the first flow path 171 and the third flow path 173, the oxygen drawn into the flow path connection unit 130 via the first flow path 171 is supplied to the inside of the metal air battery module 120 via the third flow path 173. In this state, the oxygen may be flow in through the second opening 122 into the metal air battery module 120.

The metal air battery module 120 performs a second discharging reaction by receiving a supply of oxygen through the second opening 122. The unused oxygen remaining in the metal air battery module 120 following the second discharging reaction is removed through the first opening 121. The oxygen removed through the first opening 121 is directed into the flow path connection unit 130 via the second flow path 172. Since the flow path connection unit 130 connects the second flow path 172 and the fifth flow path 175, the oxygen directed into the flow path connection unit 130 via the second flow path 172 may be exhausted to the outside via the fifth flow path 175.

As such, in the second discharging reaction process, the air intake apparatus 110 supplies the oxygen to the metal air battery module 120 through the second opening 122, and the unused oxygen remaining in the metal air battery module 120 following the second discharging reaction is exhausted to the outside through the first opening 121. Accordingly, in the second discharging reaction process, unlike the first discharging reaction process, the first and second openings 121 and 122 may function as an oxygen outlet and an oxygen inlet, respectively.

Referring to FIG. 4D, after the second discharging reaction, the metal air battery module 120 performs a second charging reaction in the metal air battery system 400. In this state, the flow path connection unit 130 connects the second flow path 172 and the sixth flow path 176, and the third flow path 173 and the fourth flow path 174.

The second charging reaction of the metal air battery module 120 of FIG. 4D is the same as the first charging reaction of the metal air battery module 120 of FIG. 4B. Accordingly, in the second charging reaction process, at least a portion of the oxygen remaining in the metal air battery module 120 may be removed by being exhausted to the outside through the second opening 122 by the operation of the inert gas supply unit 150.

FIG. 4E illustrates a modified example of the second charging reaction of FIG. 4D. In this state, the flow path connection unit 130 connects the first flow path 171 and the second flow path 172, and connects the third flow path 173 and the sixth flow path 177.

Referring to FIG. 4E, an inert gas provided by the inert gas supply unit 150 is directed into the flow path connection unit 130 via the sixth flow path 177. Since the flow path connection unit 130 connects the sixth flow path 176 and the third flow path 173, the inert gas directed into the flow path connection unit 130 via the sixth flow path 177 may be supplied to the inside of the metal air battery module 120 via the third flow path 173. The inert gas may be flow in through the second opening 122 and into the metal air battery module 120. As such, when the inert gas is supplied to the inside of the metal air battery module 120, at least a portion of the oxygen remaining in the metal air battery module 120 may be purged from the metal air battery module 120. In this process, any oxygen and inert gas remaining in the metal air battery module 120 are removed through the first opening 121, and the oxygen and inert gas removed through the first opening 121 are then directed into the flow path connection unit 130 via the second flow path 172. In this state, the air intake apparatus 110 may be operated in a reverse direction, and the oxygen and inert gas directed into the flow path connection unit 130 via the second flow path 172 may be drawn into the air intake apparatus 110 via the first flow path 171 and then exhausted to the outside.

As such, an embodiment in which the position of the oxygen inlet and the position of the oxygen outlet are alternately reversed as the process is shifted from the first discharging reaction to the second discharging reaction is described. However, the present disclosure is not limited thereto and, during the first discharging process or the second discharging process, the position of the oxygen inlet and the position of the oxygen outlet may be reversed to be opposite that which was previously described. In other words, as the discharging reactions are performed, the position of the oxygen inlet and the position of the oxygen outlet may be alternately reversed in various ways.

According to an exemplary embodiment, the metal air battery system 400 may alternately and repeatedly perform the discharging reactions and the charging reactions. In this state, as the metal air battery module 120 performs discharging reactions, the position of the oxygen inlet and the position of the oxygen outlet are alternately reversed in the metal air battery module 120. Accordingly, the lifespan of the metal air battery module 120 may be increased. Also, the metal air battery module 120 performs charging reactions between the discharging reactions. In the charging reaction process, at least a portion of the oxygen remaining in the metal air battery module 120 may be purged from the metal air battery module 120 by the inert gas supply unit 150. Accordingly, the deterioration due to the presence of oxygen remaining in the metal air battery module 120 may be prevented, and the lifespan of the metal air battery module 120 may be increased.

FIGS. 5A to 5E illustrate a metal air battery system 500 and a method of operating the same, according to an exemplary embodiment. The metal air battery system 500 of FIGS. 5A to 5E and an operation method thereof are essentially the same as the metal air battery system 100 and method of FIGS. 1A to 1E, except that the metal air battery system 500 of FIGS. 5A to 5E includes a plurality of first openings and a plurality of second openings formed in the metal air battery module 120. FIGS. 5A to 5E exemplarily illustrate an embodiment in which two first openings 121A and 121B and two second openings 122A and 122B are provided in the metal air battery module 120.

Referring to FIGS. 5A to 5E, the second flow path 172 is branched into flow paths 172A and 172B and the branched flow paths 172A and 172B are connected to the first openings 121A and 121B. The third flow path 173 is branched into flow paths 173A and 173B and the branched flow paths 173A and 173B are connected to second openings 122A and 122B.

Figure 5A:
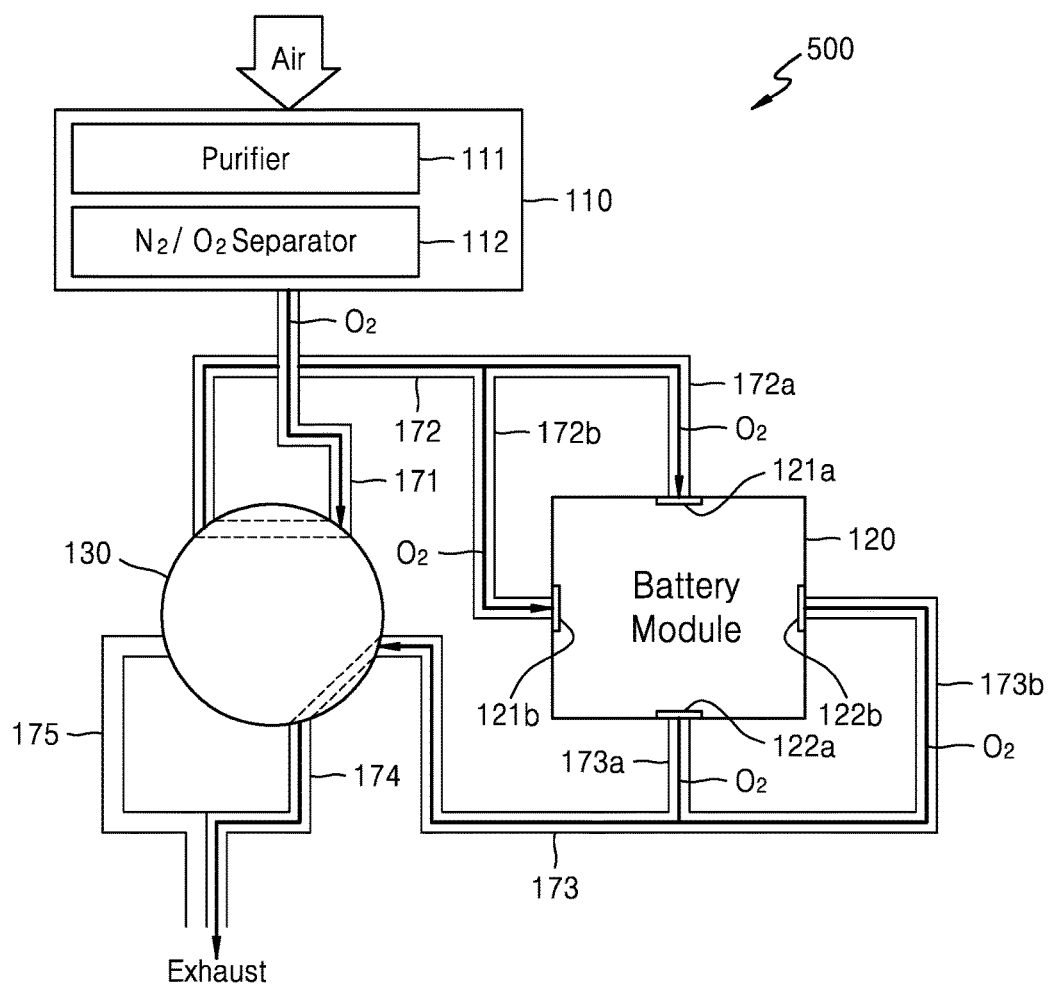
FIGS. 5A to 5E illustrate a metal air battery system and a method of operating the metal air battery system, according to an exemplary embodiment.

Referring to FIG. 5A, in the first discharging reaction process, oxygen from the air intake apparatus 110 is directed to the flow path connection unit 130 via the first flow path 171. The oxygen flows from the flow path connection unit 130 through the second flow path 172 and into the branched flow paths 172A and 172B. The oxygen then flows into the metal air battery module 120 through the first openings 121A and 121B. In this process, the oxygen remaining in the metal air battery module 120 following the first discharging reaction flows out through the second openings 122A and 122B toward the branched flow paths 173A and 173B. The branched flow paths 173A and 173B converge to form the third flow path 173 and the oxygen is directed to the flow path connection unit 130 via the third flow path 173. Since the flow connection unit 130 connects the third flow path 173 and the fourth flow path 174, oxygen directed to the flow path connection unit via the third path may be exhausted to the outside via the fourth flow path 174. Accordingly, in the first discharging reaction process, the first openings 121A and 121B may function as oxygen inlets, whereas the second openings 122A and 122B may function as oxygen outlets.

Figure 5B:
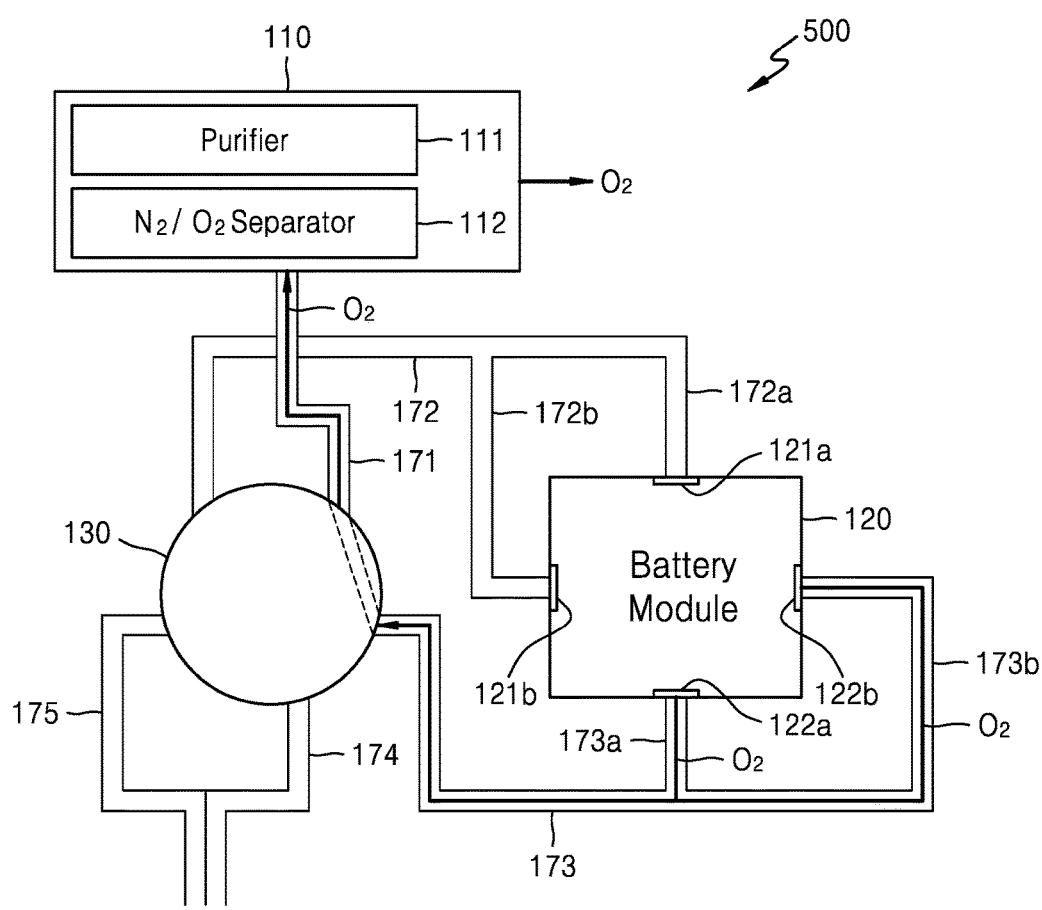
Figure 5C:
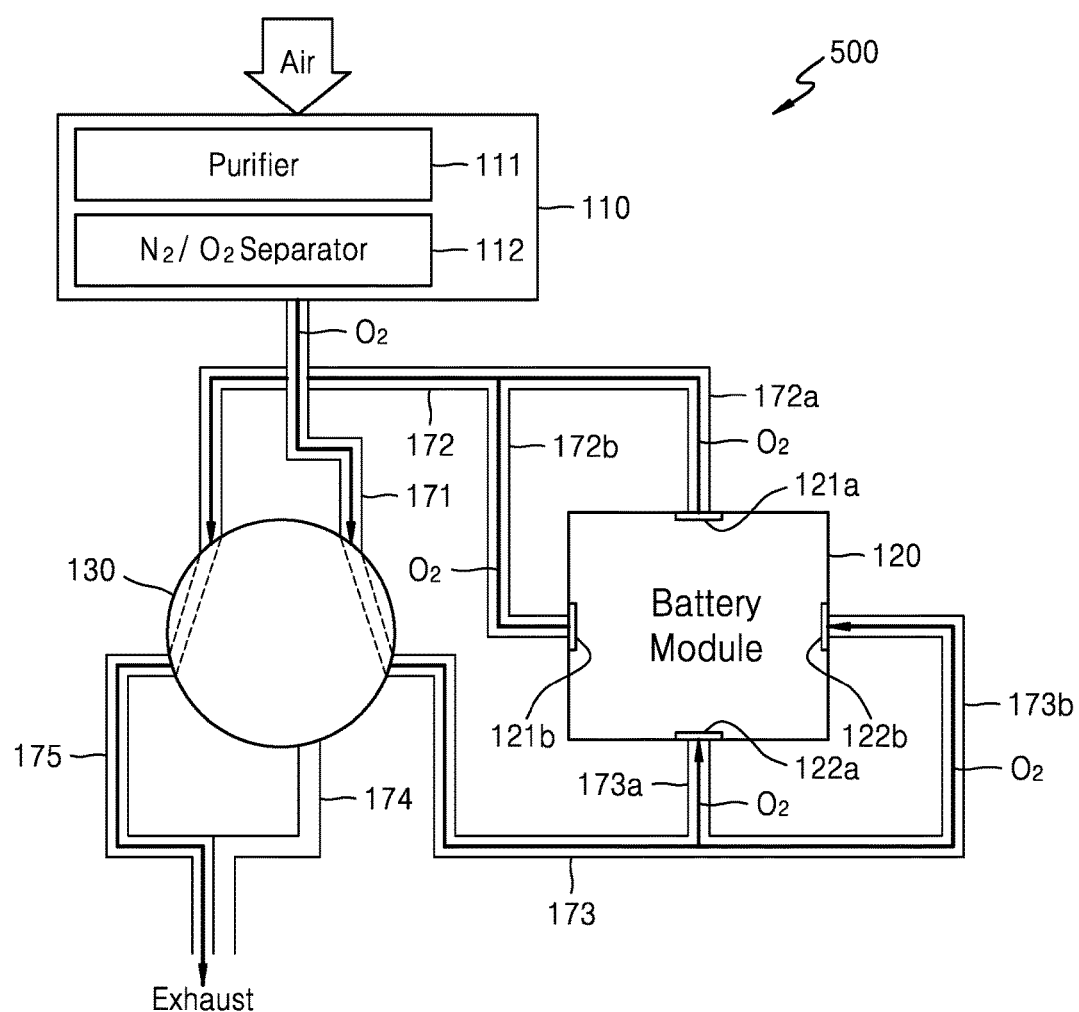

Referring to FIG. 5C, in the second discharging reaction, the oxygen supplied by the air intake apparatus 110 is directed to the flow path connection unit 130 via the first flow path 171. The oxygen flows through the third flow path 173, into the branched flow paths 173A and 173B, and then flows into the metal air battery module 120 through the second openings 122A and 122B. In this process, the oxygen remaining in the metal air battery module 120 following the second discharging reaction is directed toward the branched flow paths 172A and 172B through the first openings 121A and 121B. The branched flow paths 172A and 172B converge to form the second flow path 172 and the exhausted oxygen is directed to the flow path connection unit 130 via the second flow path 172. Since the flow connection unit 130 connects the second flow path 172 and the fifth flow path 175, oxygen directed to the flow path connection unit via the second flow path may be exhausted to the outside via the fifth flow path 175. Accordingly, in the second discharging reaction process, unlike the first discharging reaction, the first openings 121A and 121B work as oxygen outlets, whereas the second openings 122A and 122B may work as oxygen inlets.

Figure 5D:
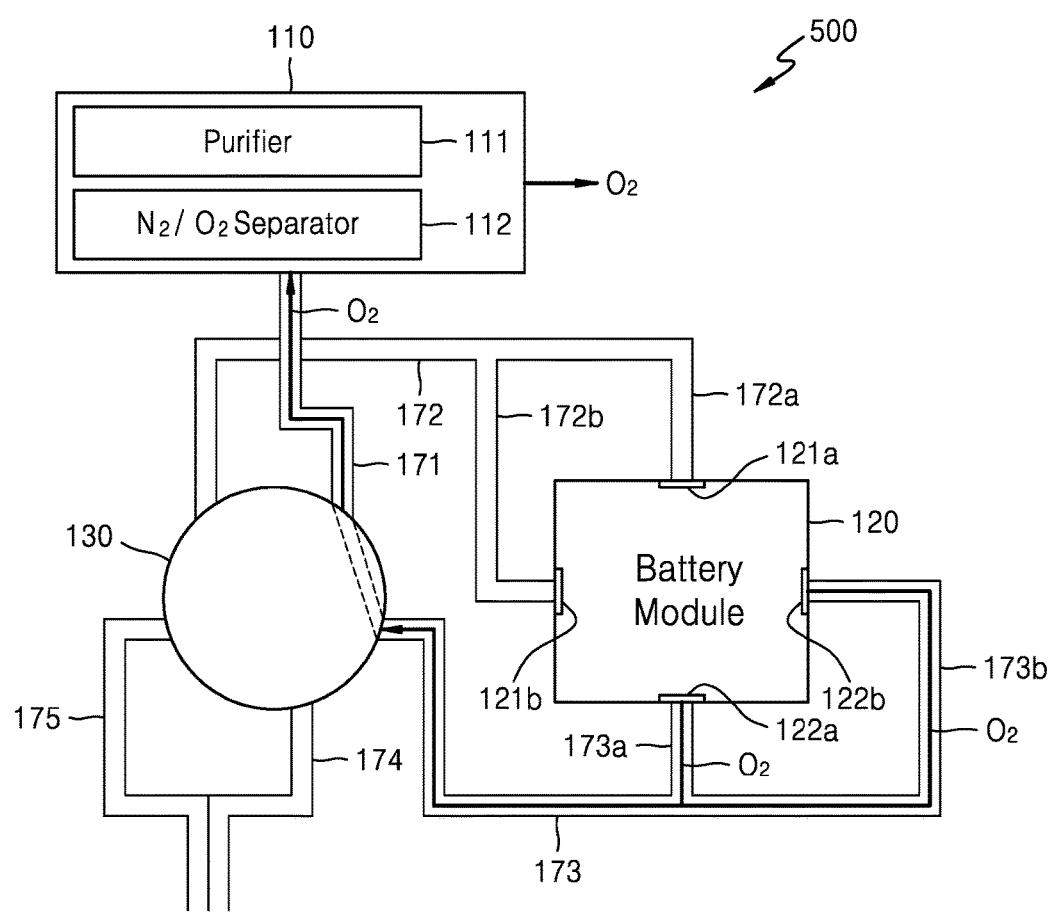
Figure 5E:
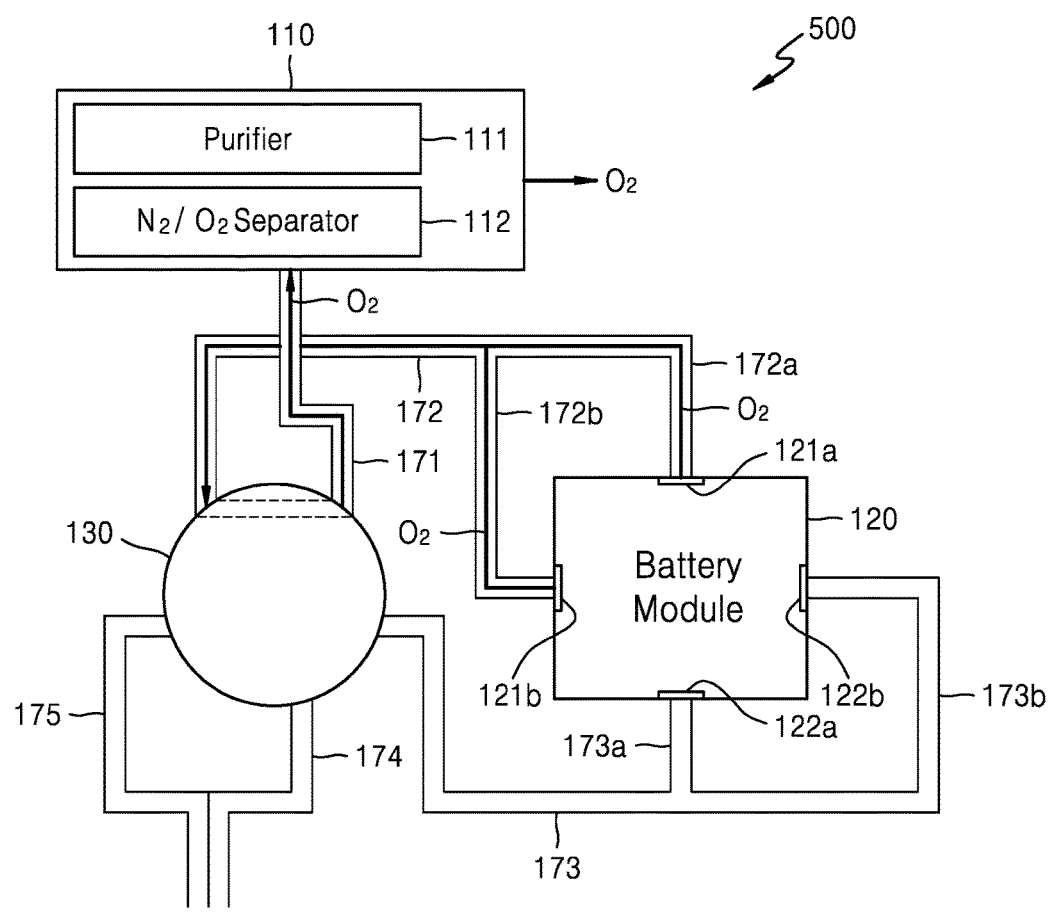

Referring to FIGS. 5B and 5D, in the charging reaction process performed between the discharging reactions, the oxygen remaining in the metal air battery module 120 may be exhausted to the outside by reversing the direction of operation of the air intake apparatus 110. FIGS. 5B and 5D illustrate an embodiment in which the oxygen remaining in the metal air battery module 120 is exhausted to the outside through the second openings 122A and 122B. Referring to FIG. 5E, the oxygen remaining in the metal air battery module 120 may be exhausted to the outside through the first openings 121A and 121B by the reverse operation of the air intake apparatus 110.

As such, an embodiment in which the position of the oxygen inlet and the position of the oxygen outlet are alternately reversed as the process is shifted from the first discharging reaction process to the second discharging reaction process is described. However, the present disclosure is not limited thereto and, during the first discharging reaction or the second discharging reaction, the position of the oxygen inlet and the position of the oxygen outlet may be reversed to be the opposite of that which was previously described. In other words, as the discharging reactions are performed, the position of the oxygen inlet and the position of the oxygen outlet may be reversed in various ways.

According to an exemplary embodiment, the metal air battery system 500 may alternately and repeatedly perform the discharging reactions and the charging reactions. In this state, as the metal air battery module 120 performs discharging reactions, the positions of the oxygen inlets and the positions of the oxygen outlets are alternately reversed in the metal air battery module 120. Accordingly, the lifespan of the metal air battery module 120 may be increased. As a plurality of oxygen inlets and a plurality of oxygen outlets are provided in the metal air battery module 120, the speed of deterioration of the cells in the metal air battery module 120 may be made more uniform. Accordingly the lifespan of the metal air battery module 120 may be increased. Also, since the metal air battery module 120 performs charging reactions between discharging reactions and at least part of the oxygen remaining in the metal air battery module 120 is removed in the charging reaction process, the deterioration of the metal air battery module 120 by the oxygen may be prevented.

In the above description, an embodiment is described in which the structure including the first openings 121A and 121B and the second openings 122A and 122B is applied to the metal air battery system 100 of FIGS. 1A to 1E. However, the present disclosure is not limited thereto, and the structure including the first openings 121A and 121B and the second openings 122A and 122B may be also applicable to the metal air battery system 200 of FIGS. 2A to 2E, the metal air battery system 300 of FIGS. 3A to 3E, and the metal air battery system 400 of FIGS. 4A to 4E.

According to the above-described exemplary embodiments, as a metal air battery module performs discharging reactions in a metal air battery system, the position of an oxygen inlet and the position of an oxygen outlet may be alternately reversed in the metal air battery module and thus the lifespan of the metal air battery module may be increased. Also, as the metal air battery module performs charging reactions between discharging reactions and, in the charging reaction process, at least a portion of the oxygen remaining in the metal air battery module is exhausted to the outside, the deterioration due to the oxygen remaining in the metal air battery module may be prevented and the lifespan of the metal air battery module may be increased.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A metal air battery system comprising:
an air intake apparatus configured to draw external air;
a metal air battery module configured to receive oxygen from the air intake apparatus to perform discharging reactions and comprising at least one inlet configured for oxygen inflow and at least one outlet configured for oxygen outflow during the discharging reactions; and
a flow path connection unit connecting the air intake apparatus to the metal air battery module,
wherein a position of the at least one inlet and a position of the at least one outlet are configured to be alternately reversed during the discharging reactions as the discharging reactions are performed, and
wherein the metal air battery module performs a charging reaction between the discharge reactions so that at least a portion of the oxygen in the metal air battery module is removed during the charging reaction of the metal air battery module.

2. The metal air battery system of claim 1, wherein the air intake apparatus comprises a purifier configured to purify air and remove moisture from the air, and a separator configured to separate the air purified by the purifier into oxygen and nitrogen.

3. The metal air battery system of claim 1, wherein the position of the inlet and the position of the outlet are configured to be alternately reversed by the flow path connection unit.

4. The metal air battery system of claim 1, wherein the air intake apparatus and the flow path connection unit are fluidly connected by a first flow path, and
wherein the flow path connection unit and the metal air battery module are fluidly connected by a second flow path.

5. The metal air battery system of claim 1, wherein the air intake apparatus is configured to remove the portion of the oxygen from the metal air battery module to an outside of the metal air battery system.

6. The metal air battery system of claim 1, wherein the air intake apparatus is configured to supply nitrogen to the metal air battery module via the flow path connection unit.

7. The metal air battery system of claim 1, further comprising a vacuum pump configured to remove the portion of the oxygen in the metal air battery module to an outside of the metal air battery system during the charging reaction of the metal air battery module.

8. The metal air battery system of claim 7, wherein the vacuum pump is fluidly connected to the flow path connection unit.

9. The metal air battery system of claim 1, further comprising an inert gas supply unit configured to supply an inert gas to the metal air battery module.

10. The metal air battery system of claim 9, wherein the inert gas is argon, helium, or nitrogen.

11. The metal air battery system of claim 9, wherein the inert gas supply unit is connected to the flow path connection unit.

12. The metal air battery system of claim 1, wherein the metal air battery module comprises at least one cell, and wherein the at least one cell comprises a cathode, an anode, and an electrolyte.

13. The metal air battery system of claim 12, wherein the metal air battery module comprises 1 to 1000 cells.

14. The metal air battery system of claim 12, wherein the metal air battery module comprises a plurality of cells connected in series, in parallel, or a combination of series and parallel.

15. A method of operating a metal air battery system, the method comprising:
providing a metal air battery system comprising a metal air battery module, the metal air battery module comprising at least one inlet through which oxygen flows into the metal air battery module from an air intake apparatus during discharging reactions, and at least one outlet through which the oxygen flows out of the metal air battery module during the discharging reactions;

discharging the metal air battery module to perform the discharging reactions, and;

alternately reversing a position of the at least one inlet and a position of the at least one outlet during the discharging reactions; and charging the metal air battery module between the discharging reactions; and removing at least a portion of the oxygen in the metal air battery module during the charging to operate the metal air battery system.

16. The method of claim 15, wherein the position of the inlet and the position of the outlet are alternately reversed by a flow path connection unit which connects the air intake apparatus to the metal air battery module.

17. The method of claim 15, wherein, during the charging of the metal air battery module, the portion of the oxygen in the metal air battery module is exhausted to an outside of the metal air battery system by reverse operation of the air intake apparatus.

18. The method of claim 15, wherein, during the charging of the metal air battery module, the portion of the oxygen in the metal air battery module is removed by supplying nitrogen to the metal air battery module.

19. The method of claim 18, wherein the air intake apparatus supplies the nitrogen to the metal air battery module.

20. The method of claim 15, wherein, during the charging of the metal air battery module, the at least a portion of the oxygen in the metal air battery module is exhausted to an outside of the metal air battery system by a vacuum.

21. The method of claim 15, wherein, during the charging of the metal air battery module, the portion of the oxygen in the metal air battery module is removed by supplying an inert gas to the metal air battery module.

22. The metal air battery system of claim 21, wherein the inert gas comprises argon, helium, nitrogen, or a combination thereof.

* * * * *